(12) United States Patent
Mann

(10) Patent No.: US 6,307,526 B1
(45) Date of Patent: Oct. 23, 2001

(54) WEARABLE CAMERA SYSTEM WITH VIEWFINDER MEANS

(76) Inventor: W. Steve G. Mann, N1NLF, University of Toronto, 10 King's College Road, Room 2001, Toronto, Ontario (CA), M5S 3G4

( * ) Notice: Subject to any disclaimer, the term of this patent is extended or adjusted under 35 U.S.C. 154(b) by 0 days.

(21) Appl. No.: 09/172,599

(22) Filed: Oct. 15, 1998

(30) Foreign Application Priority Data

Feb. 2, 1998 (CA) .................................................. 2228403
Mar. 25, 1998 (CA) .................................................. 2233047

(51) Int. Cl.[7] ...................................................... G02C 1/00
(52) U.S. Cl. .................................. 345/8; 345/7; 348/115; 348/207; 348/211
(58) Field of Search ........................... 345/7, 9; 348/115, 348/207, 211

(56) References Cited

U.S. PATENT DOCUMENTS

| | | | |
|---|---|---|---|
| 3,697,154 | 10/1972 | Johnson | 350/174 |
| 3,833,300 | 9/1974 | Rymes | 356/13 |
| 4,081,209 | 3/1978 | Heller et al. | 350/174 |
| 4,220,400 | 9/1980 | Vizenor | 350/174 |
| 4,516,157 | 5/1985 | Campbell | 358/108 |
| 4,636,866 | 1/1987 | Hattori | 358/236 |
| 4,649,434 | 3/1987 | Weinblatt | 358/250 |
| 4,786,966 | 11/1988 | Hanson et al. | 358/108 |
| 4,806,011 | 2/1989 | Bettinger | 351/158 |
| 5,095,326 | 3/1992 | Nozaki et al. | 354/222 |
| 5,189,512 * | 2/1993 | Cameron et al. | 348/838 |
| 5,323,264 | 6/1994 | Kato | 359/432 |
| 5,331,333 | 7/1994 | Tagawa et al. | 345/7 |
| 5,422,653 | 6/1995 | Maguire, Jr. | 345/9 |
| 5,486,701 * | 1/1996 | Noirton et al. | 250/372 |
| 5,546,099 | 8/1996 | Quint et al. | 345/8 |
| 5,550,585 | 8/1996 | Cherri | 348/207 |
| 5,570,156 | 10/1996 | Arai et al. | 396/51 |
| 5,610,678 | 3/1997 | Tsuboi et al. | 396/373 |
| 5,640,211 | 6/1997 | Kawano et al. | 348/663 |
| 5,640,221 | 6/1997 | Ishikawa et al. | 351/221 |

(List continued on next page.)

FOREIGN PATENT DOCUMENTS

| | | |
|---|---|---|
| 92 17 643 | 3/1993 | (DE) . |
| 44 36 528 | 4/1996 | (DE) . |
| 195 47 166 | 6/1996 | (DE) . |
| 0 665 686 | 8/1995 | (EP) . |
| 0 827 337 | 3/1998 | (EP) . |
| 8-179223 | 7/1996 | (JP) . |
| 7-199278 | 8/2000 | (JP) . |
| WO 94 26061 | 11/1994 | (WO) . |
| WO 96/14641 | 5/1996 | (WO) . |
| WO 96 36271 | 11/1996 | (WO) . |
| WO 97 34411 | 9/1997 | (WO) . |

Primary Examiner—Bipin Shalwala
Assistant Examiner—Vincent E. Kovalick
(74) Attorney, Agent, or Firm—Crowell & Moring LLP

(57) ABSTRACT

A novel means and apparatus for a new kind of photography and videography is described. In particular, a wearable camera with a viewfinder suitable for long-term use is introduced. The system, in effect, absorbs and quantifies rays of light and processes this quantigraphic information on a small wearable computer system, then the processed information is re-constituted into light rays emerging to reconstruct the virtual image of objects at nearly the same position in space, or at a coordinate transformed position, as viewed by the wearer of the apparatus. The wearer of the apparatus becomes, after adaptation, an entity that seeks, without conscious thought or effort, an optimal point of vantage and camera orientation. Because of the wearer's ability to constantly see the world through the apparatus, which may also function as an image enhancement device, the apparatus behaves as a true extension of the wearer's mind and body, giving rise to a new genre of documentary video.

4 Claims, 14 Drawing Sheets

U.S. PATENT DOCUMENTS

| | | | |
|---|---|---|---|
| 5,664,244 | 9/1997 | Yamamura et al. | 396/296 |
| 5,692,227 | 11/1997 | Yokota et al. | 396/377 |
| 5,708,449 | 1/1998 | Heacock et al. | 345/8 |
| 5,777,715 * | 7/1998 | Kruegle et al. | 351/158 |
| 5,815,741 | 9/1998 | Okuyama et al. | 396/51 |
| 5,828,793 | 10/1998 | Mann | 382/284 |
| 5,856,844 * | 1/1999 | Batterman et al. | 348/207 |
| 6,005,536 * | 12/1999 | Beadles et al. | 345/7 |
| 6,043,799 * | 3/2000 | Tidwell | 345/7 |
| 6,045,229 * | 4/2000 | Tachi et al. | 353/28 |
| 6,046,712 * | 4/2000 | Beller et al. | 345/8 |
| 6,057,966 * | 5/2000 | Carroll et al. | 359/630 |

* cited by examiner

WEARABLE CAMERA SYSTEM WITH VIEWFINDER MEANS

FIELD OF THE INVENTION

The present invention pertains generally to a new photographic or video means and apparatus comprising a body-worn portable electronic camera system with wearable viewfinder means.

BACKGROUND OF THE INVENTION

In photography (and in movie and video production), it is desirable to capture events in a natural manner with minimal intervention and disturbance. Current state-of-the-art photographic or video apparatus even in its most simple "point and click" form, creates a visual disturbance to others and attracts considerable attention on account of the gesture of bringing the camera up to the eye. Even if the size of the camera could be reduced to the point of being negligible (e.g. no bigger than the eyecup of a typical camera viewfinder, for example), the very gesture of bringing a device up to the eye is unnatural and attracts considerable attention, especially in establishments such as gambling casinos or department stores where photography is often prohibited. Although there exist a variety of covert cameras such a camera concealed beneath the jewel of a necktie clip, cameras concealed in baseball caps, and cameras concealed in eyeglasses, these cameras tend to produce inferior images, not just because of the technical limitations imposed by their small size, but, more importantly because they lack a means of viewing the image. Because of the lack of a viewfinder., investigative video and photojournalism made with such cameras suffers from poor composition.

It appears that apart from large view cameras upon which the image is observed on a ground glass, most viewfinders present an erect image. See, for example, U.S. Pat. No. 5,095,326 entitled "Keppler-type erect image viewfinder and erecting prism". In contrast to this fact, it is well-known that one can become accustomed, through long-term psychophysical adaptation (as reported by George M. Stratton, in *Psychology Review*, in 1896 and 1897) to eyeglasses that present an upside-down image. After wearing upside-down glasses constantly for eight days (keeping himself blindfolded when removing the glasses for bathing or sleeping) Stratton found that he could see normally through the glasses. More recent experiments, as conducted by and reported by Mann, in an MIT technical report *Mediated Reality*, medialab vismod TR-260, (1994), (the report is available in http://wearcam.org/mediated-reality/index.html) suggest that slight transformations such as rotation by a few degrees or small image displacements give rise to a reversed aftereffect that is more rapidly assimilated by the wearer, and that such effects can often have a more detrimental effect on performing other tasks through the camera as well as more detrimental flashbacks upon removal of the camera. These findings suggest that merely mounting a conventional camera such as a small 35 mm rangefinder camera or a small video camcorder to a helmet, so that one can look through the viewfinder and use it it hands free while performing other tasks, will result in poor performance at doing those tasks while looking through the camera viewfinder. Moreover, these findings suggest that doing tasks while looking through the viewfinder of a conventional camera, over a long period of time, may give rise to detrimental flashback effects that may persist even after the camera is removed. This is especially true when tile tasks involve a great deal of hand-eye coordination, such as when one might, for example, wish to photograph, film, or make video recordings of the experience of eating or playing volleyball or the like, by doing the task while concentrating primarily on the eye that is looking through the camera viewfinder. Indeed, since known cameras were never intended to be used this way (to record events from a first-person-perspective while looking through the viewfinder) it is not surprising that performance is poor in this usage.

Part of the reason for poor performance associated with simply attaching a conventional camera to a helmet is the induced parallax and the failure to provide an orthoscopic view. Even viewfinders which correct for parallax, as described in U.S. Pat. No. 5,692,227 in which a rangefinder is coupled to a parallax error compensating mechanism only correct for parallax between the viewfinder and the camera lens that is taking the picture, but do not correct for parallax between the viewfinder and the image that would be observed with the naked eve while not looking through the camera.

Traditional camera viewfinders often include the ability to overlay virtual objects, such as camera shutter speed, or the like, on top of reality, as described in U.S. Pat. No. 5,664,244 which describes a viewfinder with additional information display capability.

Open-air viewfinders are often used on extremely low cost cameras, as well as on some professional cameras for use at night when the light levels would be too low to tolerate any optical loss in the viewfinder. Examples of open-air viewfinders used on professional cameras, in addition to regular viewfinders, include those used on the Grafflex press cameras of the 1940s (which had three different kinds of viewfinders), as well as those used on some twin-lens reflex cameras. While such viewfinders, if used with a wearable camera system, would have the advantage of not inducing the problems such as flashback effects described above, they would fail to provide an electronically mediated reality. Moreover although such open air viewfinders would eliminate the parallax between what is seen in the real world and what is seen in the real world looking through the viewfinder, they fail to eliminate the parallax error between the viewfinder and the camera.

A manner of using a plurality of pictures of the same scene or object, in which the pictures were taken using a camera with automatic exposure control, automatic gain control, or the like has been proposed in *'PENCIGRAPHY' WITH AGC: JOINT PARAMIETER ESTIMIATION IN BOTH DOMAIN AND RANGE OF FUNCTIONS IN SAME ORBIT OF THE PROJECTIVE-WYCKOFF GROUP*, published by S. Mann, in M.I.T. (medialab vismod) tech report TR-384, December, 1994, and later published also in Proceedings of the IEEE International Conference on Image Processing (ICIP-96), Lausanne, Switzerland, Sep. 16–19, 1996, pages 193–196, the contents of which are incorporated herein by reference. (The report is also available on a world wide web site: http://wearcam.org/icip96/index.html as a hypertext document.) This report relates to a manner of camera self-calibration in which the unknown nonlinear response function of the camera is determined up to a single unknown scalar constant. Therefore, once the camera is so understood, it may be used, within the context of the method, as a quantigraphic light measuring instrument. As each pixel of the camera then becomes a light measuring instrument, successive pictures in a video sequence become multiple estimates of the same quantity once the multiple images are registered and appropriately interpolated. The measurement from a plurality of such estimates gives rise to knowledge about the scene sufficient to render pictures of increased dynamic range and tonal fidelity, as well as increased spatial resolution and extent. In this way a miniature video camera as may be concealed inside a pair of eyeglasses may be used to generate images of very high quality, sufficient for fine-arts work or other uses where good image quality is needed.

SUMMARY OF THE INVENTION

It is an object of this invention to provide a method of positioning a camera in which both hands may be left free.

It is a further object of this invention to provide a means of exposing a film or acquiring a picture electronically where the spatial extent (field of view) of the image may be ascertained without having to hold any device up to the eye.

What is described is a wearable camera and viewfinder for capturing video of exceptionally high compositional and artistic caliber. In addition to the fact that covert versions of the apparatus can be used to create investigative documentary videos having very good composition, for everyday usage the device need not necessarily be covert. In fact, it may be manufactured as a fashionable device that serves as both a visible crime deterrent, as well as a self-explanatory (through its overt obviousness) tool for documentary videomakers and photojournalists.

Another feature of the invention is that the wearable camera has a viewfinder such that the image may be presented in a natural manner suitable for long-term usage patterns.

There are several reasons why it might be desired to wear the camera over a sustained period of time:

1. There is the notion of a personal visual diary of sorts.
2. There is the idea of being always ready. By constantly recording into a circular buffer, a retroactive record function, such as a button that instructs the device to "begin recording from five minutes ago" may be useful in personal safety (crime reduction) as well as in ordinary everyday usage, such as capturing a baby's first steps on video. With the prior art in photography and video, we spend so much time preparing the camera and searching for film, batteries, etc., or at the very least, just getting the camera out of its carrying case, that we often miss important moments like a baby's first steps, or a spontaneous facial expression during the opening of a gift.
3. There is the fact that the wearable camera system, after being worn for a long period of time, begins to behave as a true extension of the wearer's mind and body. As a result, the composition of video shot with the device is often impeccable without even the need for conscious thought or effort on the part of the user. Also, one can engage in other activities, and one is able to record the experience without the need to be encumbered by a camera, or even the need to remain aware, at a conscious level, of the camera's existance. This lack of the need for conscious thought or effort suggests a new genre of documentary video characterized by long-term psychophysical adaptation to the device. The result is a very natural first-person perspective documentary, whose artistic style is very much as if a recording could be made from a video tap of the optic nerve of the eye itself. Events that may be so recorded include involvement in activities such as horseback riding, climbing up a rope, or the like, that cannot normally be well recorded from a first-person perspective using cameras of the prior art. Moreover, a very natural first-person perspective genre of video results. For example, while wearing an embodiment of the invention, it is possible to look through the eyepiece of a telescope or microscope and record this experience, including the approach toward the eyepiece. The experience is recorded, from the perspective of the participant.

4. A computational system, either built into the wearable camera, or worn on the body elsewhere and connected to the camera system, may be used to enhance images. This may be of value to the visually impaired. The computer may also perform other tasks such as object recognition. Because the device is worn constantly, it may also function as a photographic/videographic memory aid, e.g. to help in wayfinding through the recall and display of previously captured imagery.

It is desired that the proposed viewfinder arrangement be suitable for long-term usage, such as when one may be wearing the camera for sixteen hours per day, looking through it all the while. Traditional viewfinders are only looked through on a shorter term basis. Thus there will be some important differences between the wearable camera system and traditional cameras. For example, when the wearable camera system comprises a zoom lens for the camera, it is desired that the viewfinder also comprise a zoom lens, so that when zooming into a scene, the image in the viewfinder can be made to subtend a lesser visual angle (appear to get smaller). It is also desired that the exact extent of this reduction in apparent visual angle be controlled to exactly cancel out the usual effect in which zooming in produces increased magnification. In this manner the wearable camera system provides the wearer with absolutely no apparent magnification, or change in apparent magnification, while looking through the viewfinder and exploring the full range of zoom adjustment.

Some viewfinders are equipped with a zoom capability, as, for example is described in U.S. Pat. No. 5,323,264, so that their field of coverage (magnification) varies with the varying of a zoom lens. The reader will need to be careful not to confuse these zoom viewfinders of the prior art with the zoom viewfinder of the wearable camera invention in which viewing takes place through an electronic viewfinder where the decrease in visual angle subtended by the image of the viewfinder screen is coupled to the increase in focal length of the camera within the proposed invention. This coupling negates (cancels out) any increase in magnification that would otherwise result from zooming in on the scene. At first this Lack of increase in apparent magnification with increase in lens focal-length may seem counter-intuitive, in the sense that we normally expect zooming in to produce an increase in apparent magnification as observed while looking through a camera viewfinder. This expectation is owing to known cameras. However, after using the wearable camera system for an extended period of time, one quickly grows accustomed to the unique characteristics of its viewfinder, and the much more seamless integration of its viewfinder with everyday life. This seamlessness is such that after time, the wearer will begin to operate the wearable camera invention without appreciable conscious thought or effort. With magnification, or changes in magnification it is much more difficult to fully adapt to the presence of the camera.

An important aspect of the proposed invention is the capability of the apparatus to mediate (augment, diminish, or otherwise alter) the visual perception of reality.

The proposed camera viewfinder is related to the displays that are used in the field of Virtual Reality (VR) in the sense that both are wearable. However, an important difference is that the proposed invention allows the wear to continue to see the real world, while VR displays block out the ability to see the real world.

It is possible with the invention to allow visual reality to be mediated in order to make certain that exposure is correct as well as to keep he wearer of the apparatus in the feedback loop of the photo compositional process by constantly providing the wearer with a video stream. Moreover, it is desired that the apparatus will allow the wearer to experience a computationally mediated visual reality, and for that experience to be shared through wireless communications networks so that the wearer may receive additional visual information, as well as be aware of modifications to visual reality that might arise, for example, as part of a communications process in a shared virtual environment. For such compositional and interactional capabilities, a simple air-based viewfinder is inadequate.

It is possible with this invention to provide such a method of exposing a film or acquiring a picture electronically where the tonal characteristics of the picture may be ascertained without having to hold any device up to the eye.

It is possible with this invention to provide such a method of exposing a film or acquiring a picture electronically where no apparent difference in body movement or gesture between when a picture is being taken and when no picture is being taken is detectable by others.

It is possible with this invention to provide the user with a means of determining the composition of the picture from a display device that is located such that only the user can see the display device, and so that the user can ascertain the composition of a picture or take a picture or video and transmit image(s) to one or more remote locations without the knowledge of others in the immediate environment.

It is possible with this invention to provide the user with a means of determining the composition of the picture from a display device that is located such that only the user can see the display device, as well as an optional additional display device that the user can show to others if and when the user desires to do so.

It is possible with this invention to provide the user with a means of determining the composition of the picture from a display device that is located such that both the user as well as others can see it, if the user should so desire.

It is possible with this invention to provide a wearable camera viewfinder means in which video is displayed on a viewfinder in such a way that all rays of light from the viewfinder that enter the eye appear to emanate from essentially the same direction as they would have had the apparatus not been worn.

It is possible with this invention to provide a means for a user to experience additional information overlaid on top of his or her visual field of view such that the information is relevant to the imagery being viewed.

It is possible with this invention to provide a means and apparatus for a user to capture a plurality of images of the same scene or objects, in a natural process of simply looking around, and then have these images combined together into a single image of increased spatial extent, spatial resolution, dynamic range, or tonal fidelity.

It is possible with this invention to provide a viewvfinder means in which the viewfinder has a focusing mechanism that is coupled to a focusing mechanism of a camera system, so that when the camera is focused on a particular object the viewfinder also presents that object in a manner such that when the apparatus moves relative to the user's eye, the object appears to neither move with or against the movement of the eye, so that the rays of light entering the eye are approximately the same in direction as if the apparatus were not present.

It is possible with this invention to provide a viewfinder means in which the viewfinder has a focusing mechanism that is coupled to a focusing mechanism of a camera system, so that when the camera is focused on a particular object the viewfinder also presents that object in the same focal depth plane as the object would appear to the user with the apparatus removed.

It is possible with this invention to provide a viewfinder means in which the viewfinder has a focusing mechanism that is controlled by an automatic focusing mechanism of a camera system.

It is possible with this invention to provide a stereo viewfinder means in which the viewfinder system has camera focusing camera vergence, display focusing, and display vergence control where all four are linked together so that there is only need for a single control.

It is possible with this invention to provide a stereo viewfinder means in which the viewfinder has focusing and vergence control mechanisms that are controlled by an automatic focusing mechanism of a camera system.

It is possible with this invention to provide a viewfinder means in which the viewfinder has a focusing mechanism that is controlled by an automatic focusing mechanism of a camera system, and in which the apparatus comprises an eye-tracking mechanism that causes the focus of the camera to be based on where the user is looking, and therefore the focus of the viewfinder mechanism to be also focused in such a manner that the convergence of light rays from whatever object happens to be within the foveal region of the eye s view also produce, rays of light that have the same focal distance as they would have had with the apparatus removed from the user.

The proposed invention facilitates a new form of visual art, in which the artist may capture, with relatively little effort, a visual experience as viewed from his or her own perspective. With some practice, it is possible to develop a very steady body posture and mode of movement that best produces video of the genre pertaining to this invention. Because the apparatus may be lightweight and close to the head, there is not the protrusion associated with carrying a hand-held camera. Also because components of the proposed invention are mounted very close to the head, in a manner that balances the weight distribution. Mounting close do the head minimizes the moment of inertia about the rotational axis of the neck, so that the head can be turned quickly while wearing the apparatus. This arrangement allows one to record the experiences of ordinary day-to-day activities from a first-person perspective. Moreover, because both hands are free, much better balance and posture is possible while using the apparatus. Anyone skilled in the arts of body movement control as is learned in the martial arts such as karate, as well as in dan(,e, most notably ballet, will have little difficulty capturing exceptionally high quality video using the apparatus of this invention.

With known video or movie cameras, the best operators tend to be very large people who have trained for many years in the art of smooth control of the cumbersome video or motion picture film cameras used. In addition to requiring a very large person to optimally operate such cameras, various stabilization devices are often used., which make the apparatus even more cumbersome. The apparatus of the invention may be optimally operated by people of any size. Even young children can become quite proficient in the use of the wearable camera system.

A typical embodiment of the invention comprises one or two spatial light modulators or other display means built into a pair of eyeglasses together with one or more sensor arrays. Typically one or more CCD (charge coupled device) image sensor arrays rays and appropriate optical elements comprise the camera portion of the invention. Typically a beamsplitter or a mirror silvered on both sides is used to combine the image of the viewfinder with the apparent position of the camera. The viewfinder is simply a means of determining the extent of coverage of the camera in a natural manner, and may comprise either of:

A reticle, graticule, rectangle, or other marking that appears to float within a portion of the field of view.

A display device that shows a video image, or some other dynamic information perhaps related to the video image coming from the camera.

One aspect of the invention allows a photographer or videographer to wear the apparatus continuously and therefore always end up with the ability to produce a picture from something that was seen a couple of minutes ago. This may be useful to everyone in the sense that we may not want to miss a great photo opportunity, and often great photo opportunities only become known to us after we have had time to think about something we previously saw.

Such an apparatus might also be of use in personal safety. Although there are a growing number of video surveillance cameras installed in the environment allegedly for "public safety", there have been recent questions as to the true benefit of such centralized surveillance infrastructures. Most notably the re have been several examples in which such centralized infrastructure has been abused by the owners of it (as in roundups and detainment of peaceful demonstrators). Moreover, "public safety" systems may fail to protect individuals against crimes committed by the organizations that installed the systems. The apparatus of this invention allows the storage and retrieval of images by transmitting and recording images at one or more remote locations. Images may be transmitted and recorded in different countries, so that they would be difficult to destroy, in the event that the perpetrator of a crime might wish to do so.

The apparatus of the invention allows images to be captured in a natural manner, without giving an unusual appearance to others (such as a potential assailant).

Moreover, as an artistic tool of personal expression, the apparatus allows the user to record, from a first-person-perspective, experiences that have been difficult to so record in the past. For example, a user might be able to record the experience of looking through binoculars while riding horseback, or the experience of waterskiing, rope climbing, or the like. Such experiences captured from a first-person perspective provide a new genre of video by way of a wearable camera system with viewfinder means that goes beyond current state-of-the-art point of view sports videos (such as created by cameras mounted in sports helmets which have no viewfinder means).

A typical embodiment of the invention comprises a wearable viewfinder system which is fitted with a motorized focusing mechanism. A camera also fitted with a motorized focusing mechanism is positioned upon one side of a mirror that is silvered on both sides, so that the viewfinder can be positioned on t he other side and provide a view that is focused to whatever the camera is focused on. Such an apparatus allows the user to record a portion of his or her eye's visual field of view. With the correct design, the device will tend to cause the wearer to want to place the recording zone over top of whatever is most, interesting in the scene. This tendency arises from the enhancement of the imagery in this zone. In much the same way that people tend to look at a TV set in a darkened room, regardless of what is playing (even if the TV is tuned to a blank station and just playing "snow") there is a tendency when wearing the invention to look at the recording/display/viewfinder zone. Therefore, there is a tendency to try to put the recording zone on top that which is of most interest. Therefore using the apparatus, after time, does not require conscious thought or effort. In was once said that television is more real than real life, and in much the same way, the wearer of the apparatus becomes a cybernetic organism (cyborg) in a true synergy of human and camera. This is particularly true with a low vision system in which one can actually see better through the viewfinder than in real life (e.g. at night when an image intensifier provides enhanced vision). In this case, the tendency of the wearer to want to become an organism that seeks best picture is very pronounced.

In accordance with the present invention there is provided camera bearing headgear, comprising: an electronic camera borne by said headgear, said electronic camera having an adjustable camera characteristic; an electronic display responsive to an electronic output from said electronic camera, said electronic display borne by said head gear for providing a viewfinder for said electronic camera, said electronic display having an adjustable display characteristic; a display control for adjusting said adjustable display characteristic commensurate with adjustments of said adjustable camera characteristic.

According to another aspect of the present invention, there is provided camera bearing headgear, comprising: an electronic camera borne by said heads gear; an electronic display for providing a viewfinder for said electronic camera, said electronic display; responsive to an electronic output from said electronic camera; borne by said headgear; positioned such that an optical axis of said camera is perpendicular to an optical axis of said display; and having a polarizer; a mirror arranged for diverting light that would otherwise enter an eye of a wearer to said camera and for diverting light emitted from said display to said eye of said wearer such that diverted light from said display is collinear with said light that would otherwise enter said eye of said wearer; a first beamsplitter, said first beamsplittтr positioned between said mirror and said eye of said wearer; a second beamsplitter interposed along said optical axes and making a 45° angle with said optical axes; and a further polarizer in front of said camera oriented to block polarized light emitted by said display.

According to a fiber aspect of the present invention, there is provided camera bearing headgear, comprising: an electronic camera borne by said headgear; an electronic display for providing a viewfinder for said electronic camera, said electronic display: responsive to an electronic output from said electronic camera; borne by said headgear; optics including a beamsplitter such that light emitted from said display passes through said beamsplitter at least once before travelling away from said beamsplitter and then back toward said beamsplitter and being reflected off said beamsplitter toward an eye of a wearer.

According to another aspect of the invention, there is provided camera bearing headgear, comprising: an electronic camera borne by said headgear; a carmera light polarizer associated with said camera such that light entering said camera passes through said camera light polarizer; an electronic display responsive to an electronic output from said electronic camera, said electronic display borne by said headgear for providing a viewfinder for said electronic camera; a beamsplitter for diverting incoming light to said electronic camera and for diverting light from said electronic display to an eye of a wearer; means for polarizing, light from said display so as to, in conjunction with said camera light polarizer, prevent feedback to said electronic camera.

According to a further aspect of the invention, there is provided headgear having an electronic camera borne by said headgear and an electronic display borne by said headgear, said electronic display responsive to an output from said electronic carmera, wherein the improvement comprises: reflective optics arranged for reflecting light such that at least a portion of a first pencil of light which would otherwise converge at a first point outside a lens assembly of said camera is reflected to a second pencil of light directed at an optical center of said lens assembly of said camera, said lens assembly comprising at least one lens, wherein said optics is further for reflecting light from said display such that said reflected light from said display forms a pencil of light approximating said first pencil of light, in order to provide substantial exact registration of what would have been seen at said first point, in the absence of said headgear, with what, in the presence of said headgear, is seen at said first point.

BRIEF DESCRIPTION OF THE DRAWINGS

The invention will now be described in more detail, by way of examples which in no way are meant to limit the scope of the invention, but, rather, these examples will serve to illustrate the invention with reference to the accompanying drawings, in which:

FIG. 10 shows an embodiment of the invention where an eye tracker is used to set the stereo camera focus, the stereo viewfinder focus, and the vergence, to all correspond with the object, the wearer is looking at.

DETAILED DESCRIPTION OF THE PREFERRED EMBODIMENTS

Figure 1:
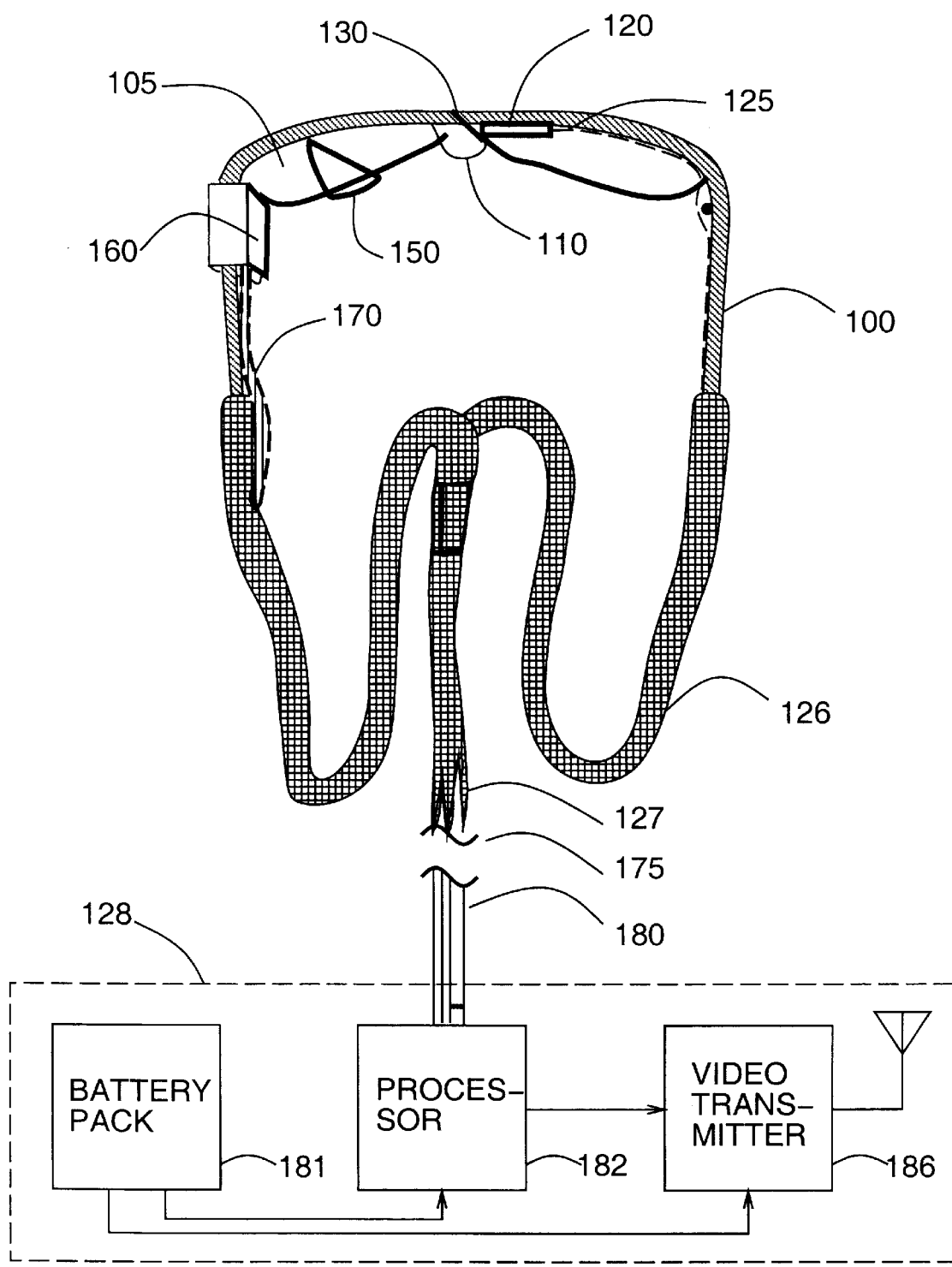
FIG. 1 is a diagram of a simple embodiment of the invention in which there are two cameras, a wide-angle camera concealed in the nose bridge of a pair of sunglasses, a tele-camera concealed in the top part of the frame of the sunglasses, and combined by way of a beamsplitter with the wide-camera, as well as a viewfinder means concealed in the left temple side-piece of the glasses with optics concealed in or behind the glass of the left lens.

While the invention shall now be described with reference to the preferred embodiments shown in the drawings, it should be understood that the intention is not to limit the invention only to the particular embodiments shown but rather to cover all alterations, modifications and equivalent arrangements possible within the scope of appended claims.

In all aspects of the present invention, references to "camera" mean any device or collection of devices capable of simultaneously determining a quantity of light arriving from a plurality of directions and or at a plurality of locations, or determining some other attribute of light arriving from a plurality of directions and or at a plurality of locations. Similarly references to "display", "television" or the like, shall not be limited to just television monitors or traditional televisions used for the display of video from a camera near or distant but shall also include computer data display means, computer data monitors, other video display devices, still picture display devices, ASCII text display devices, terminals, systems that directly scan light onto the retina of the eye to form the perception of an image, direct electrical stimulation through a device implanted into the back of the brain (as might create the sensation of vision in a blind person), and the like.

With respect to both the cameras and displays, as broadly defined above, the term "zoom" shall be used in a broad sense to mean any lens of variable focal length, any apparatus of adjustable magnification, or any digital, computational, or electronic means of achieving a change in apparent magnification. Thus, for example, a zoom viewfinder, zoom television, zoom display, or the like, shall be taken to include the ability to display a picture upon a computer monitor in various sizes through a process of image interpolation as may be implemented on a body-worn computer system.

References to "processor", or "computer" shall include sequential instruction, parallel instruction, and special purpose architectures such as digital signal processing hardware, Field Programmable Gate Arrays (FPGAs), programmable logic devices. as well as analog signal processing devices.

References to "transceiver" shall include various combinations of radio transmitters and receivers, connected to a computer by way of a Terminal Node Controller (TNC), comprising, for example, a modem and a High Level Datalink Controller (HDLCs), to establish a connection to the Internet, but shall not be limited to this form of communication. Accordingly, "transceiver" may also include analog transmission and reception of video signals on different frequencies, or hybrid systems that are partly analog and partly digital. The term "transceiver" shall not be limited to electromagnetic radiation in the frequence bands normally associated with radio, and may therefore include infrared or other optical frequencies. Moreover, the signal need not be electromagnetic, and "transceiver" may include gravity waves, or other means of establishing a communications channel.

While the architecture illustrated shows a connection from the headgear, through a computer, to the transceiver, it will be understood that the connection may be direct, bypassing the computer, if desired, and that a remote computer may be used by way of a video communications channel (for example a full-duplex analog video communications link) so that there may be no need for the computer to be worn on the body of the user.

The term "headgear" shall include helmets, baseball caps, eyeglasses, and any other means of affixing an object to the head, and shall also include implants, whether these implants be apparatus imbedded inside the skull, inserted into the back of the brain, or simply attached to the outside of the head by way of registration pins implanted into the skull. Thus "headgear" refers to any object on, around, upon, or in the head, in whole or in part.

When it is said that object "A" is "borne" by object "B", this shall include the possibilities that A is attached to B, that A is part of B, that A is built into B, or that A is B.

Figure 1A:
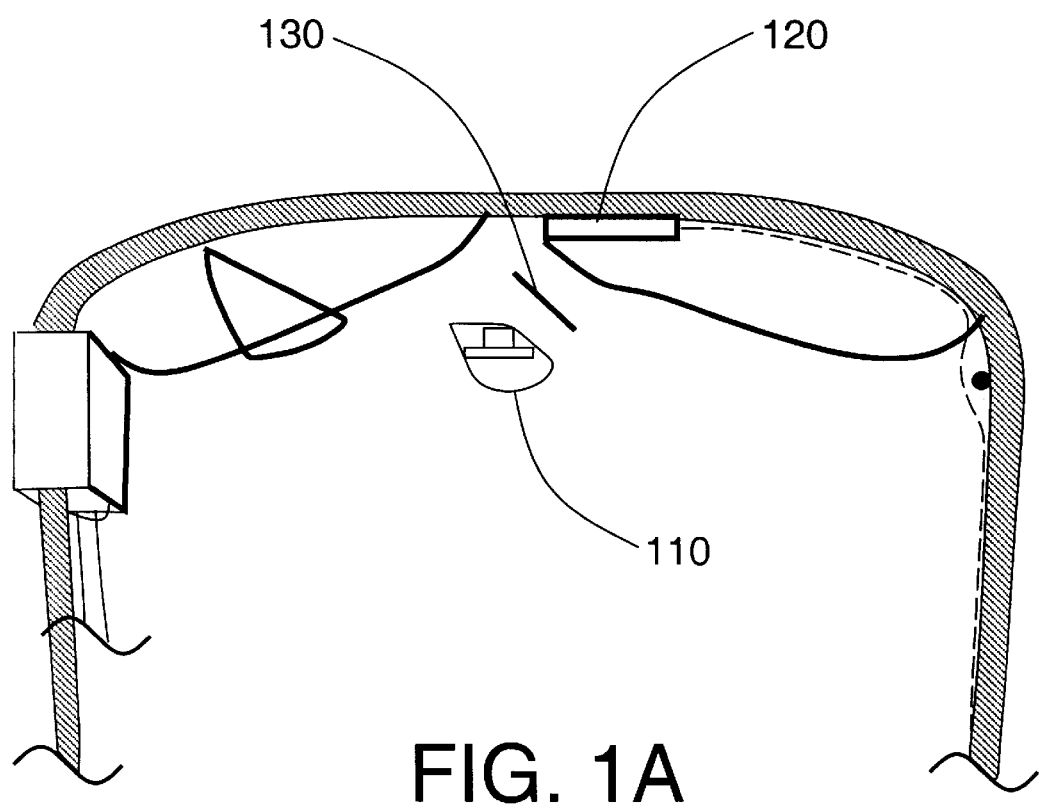
FIG. 1A is an exploded view of a portion of FIG. 1.

FIG. 1 shows an embodiment of the invention built into eyeglass frames 100, typically containing two eyeglass lenses 105. An electronic wide-angle camera 110 is typically concealed within the nose bridge of the eyeglass frames 100. In what follows, the wide-angle camera 110 may be simply referred to as the "wide-camera". or as "wide-angle camera",. In this embodiment of the wearable camera, a second camera, 120, is also concealed in the eyeglass frames 100. This second camera is one which has been fitted with a lens of longer focal length, and will be referred to as a "narrow-angle camera", or simply a "narrow-camera" in what follows. The wide-camera 110 faces forward looking through a beamsplitter 130. The narrow-camera 120 faces sideways looking through the beamsplitter. For clarity, the bearnsplitter 130 and camera 110 are shown separated in FIG. 1a, while in actual construction, the beamsplitter is cemented between the two cameras as shown in FIG. 1. The beamsplitter 130 is typically mounted at a 45 degree angle, and the optical axes of the two cameras are typically at 90 degree angles to each other. The optical axes of the two cameras should intersect and thus share a common viewpoint. Thus the narrow camera 120 may have exactly the same field of view as the wide-camera 110. Typically eyeglasses with black frames are selected, and a CCI) sensor array for wide-camera 110 is concealed in a cavity which is also used as a nose bridge support, so that the eyeglasses have a normal appearance. Typically, the body of the wide-camera is formed from epoxy, which sets it permanently in good register with the beamsplitter and the narrow-camera 120. During setting of the epoxy, the cameras are manipulated into an exact position, to ensure exact collinearity of the two effective optical axes. The wide-camera 110 is typically fitted with a lens having a diameter of approximately 1/32 inch (less than one millimeter) —small enough that it cannot be easily seen by someone at close conversational distance to the person wearing the eyeglasses. The narrow-camera 120 is typically concealed in the upper portion of the eyeglass frames. The narrow-camera 120 is preferably custom-made, like the wide-camera, by encapsulating a CCD sensor array, or the like, in an epoxy housing together with the appropriate lens, so that cameras 110 and 120 are both bonded to beamsplitter 130, and all three are in turn bonded to the eyeglass frame. A satisfactory narrow-camera, for use in small-production runs of the invention (where it is difficult to construct the housing from epoxy) is an Elmo QN42H camera, owing to its long and very slender (7 mm diameter) construction. In mass-production, a custom-made narrow-camera could be built directly into the eyeglass frames. Since the narrow-camera 120 is typically built into the top of the eyeglass frames, the wide-camera 110 should also be mounted near the top of the frames, so the two optical axes can be made to intersect at right angles, making the effective optical axes (e.g. that of camera 120 as reflected in beamsplitter 130) collinear.

Preferably, a complete camera system providing NTSC video is not installed directly in the eyeglasses. Instead, wires 125 from the camera sensor arrays are concealed inside the eyeglass frames and run inside a hollow eyeglass safety strap 126, such as the safety strap that is sold under the traders "Croakies". Eyeglass safety strap 126 typically extends to a long cloth-wrapped cable harness 180 and, when worn inside a shirt, has the appearance of an ordinary eyeglass safety strap, which ordinarily would hang down into the back of the wearer's shirt. Wires 125 are run down to a belt pack or to a body-worn pack 128, often comprising a computer as part of processor 182, powered by battery pack 181 which also powers the portions of the camera and display system located in the headgear. The processor 182, if it includes a computer, preferably contains also a non-volatile storage device or network connection. Alternatively, or in addition to the connection to processor 182, there is often another kind of recording device, or connection to a transmitting device 186. The transmitter 186, if present, is typically powered by the same battery pack 181 that powers the processor. In some embodiments, a minimal amount of circuitry may be concealed in the eyeglass frames so that the wires 125 may be driven with a buffered signal in order to reduce signal loss. In or behind one or both of the eyeglass lenses 105, there is typically an optical system 150. This optical system provides a magnified view of an electronic display in the nature of a miniature television screen 160 in which the viewing area is typically less than one inch (or less than 25 millimeters) on the diagonal. The electronic display acts as a viewfinder screen. The viewfinder screen may comprise a ¼ inch (approx. 6 mm) television screen comprising an LCD spatial light modulator with a field-sequenced LED backlight. Preferably custombuilt circuitry is used. However, a satisfactory embodiment of the invention may be constructed by having the television screen be driven by a coaxial cable carrying a video signal similar to an NTSC RS-170 signal. In this case the coaxial cable and additional wires to power it are concealed inside the eyeglass safety-strap and run down to a belt pack or other body-worn equipment by connection 180.

In some embodiments, television 160 contains a television tuner so that a single coaxial cable may provide both signal and power. In other embodiments the majority of the electronic components needed to construct the video signal are worn on the body, and the eyeglasses contain only a minimal amount of circuitry, perhaps only a spatial light modulator, LCD flat panel, or the like, with termination resistors and backlight. In this case, there are a greater number of wires 170. In some embodiments of the invention the television screen 160 is a VGA computer display, or another form of computer monitor display, connected to a computer system worn on the body of the wearer of the eyeglasses.

Wearable display devices have been described, such as in U.S. Pat. No. 5,546,099, Head mounted display system with light blocking structure, by Jessica L. Quint and Joel W. Robinson, Aug. 13, 1996, as well as in U.S. Pat. No. 5,708,449, Binocular Head Mounted Display System by Gregory Lee Hcacock and Gordon B. Kuenster, Jan. 13, 1998. (Both of these two patents are assigned to Virtual Vision, a wellknown manufacturer of head-mounted displays). A "personal liquid crystal image display" has been described U.S. Pat. No. 4,636,866, by Noboru Hattori, Jan. 13, 1987. Any of these head-mounted displays of the prior art may be modified into a form such that they will function in place of television display 160.

In typical operation of the system of FIG. 1, light enters the eyeglasses and is absorbed and quantified by one or more cameras. By virtue of the connection 180, information about the light entering the eyeglasses is available to the body-worn computer system previously described. The computer system may calculate the actual quantity of light, up to a single unknown scalar constant, arriving at the glasses from each of a plurality of directions corresponding to the location of each pixel of the camera with respect to the camera's center of projection. This calculation may be done using the PENCIGRAPHY method described above. In some embodiments of the invention the narrow-camera 120, is used to provide a more dense array of such photoquanta estimates. This increase in density toward the center of the visual field of view matches the characteristics of the human visual system in which there is a central foveal region of increased visual acuity. Video from one or both cameras is possibly processed by the body-worn computer 182 and recorded or transmitted to one or more remote locations by a body-worn video transmitter 186 or body-worn Internet connection, such as a standard WA4DSY 56 kbps RF link with a KISS 56 eprom running TCP/IP over an AX25 connection to the serial port of the body-worn computer. The possibly processed video signal is sent back up into the eyeglasses through connection 180 and appears on viewfinder screen 160, viewed through optical elements 150.

Figure 1B:
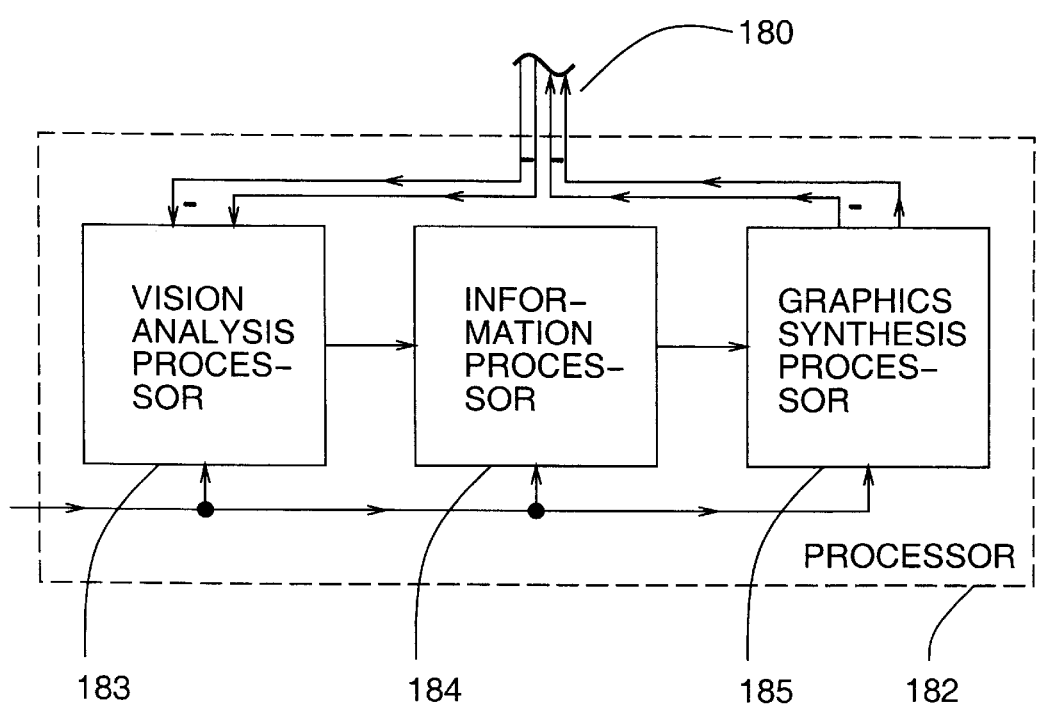
FIG. 1B is a detail view of a portion of FIG. 1.

Typically, rather than displaying raw video on display 160, processed video is displayed thereupon, with reference also to FIG. 1b (a close-up detail view of processor 182), as follows: The video outputs from cameras 110 and 120 pass through wiring harness 180 into vision analysis processor 183. Vision analysis processor 183 typically uses the output of the wide-camera for head-tracking. This head-tracking determines the relative orientation (yaw, pitch, and roll) of the head based on the visual location of objects in the field of view of camera 110. Vision analysis processor 183 may also perform some 3-D object recognition or parameter estimation, or construct a 3-D scene representation. Information processor 184 takes this visual information, and decides which virtual objects, if any, to insert into the viewfinder. Graphics synthesis processor 185 creates a computer-graphics rendering of a portion of the 3-D scene specified by the information processor 184, and presents this computer-graphics rendering by way of wires in wiring harness 180 to television screen 160. Typically the objects displayed are synthetic (virtual) objects overlaid in the same position as some of the real objects from the scene. Typically the virtual objects displayed on television 160 correspond to real objects within the field of view of narrow-camera 120. In this way, narrow camera 120 provides vision analysis processor 183 with extra details about the scene so that the analvsis is more accurate in this foveal region, while wide-camera 110 provides both an anticipatory role and a head-tracking role. In the anticipatory role, vision analysis processor 183 is already making crude estimates of identity or parameters of objects outside the field of view of the viewfinder screen 160, with the possible expectation that the wearer may at any time turn his or her head to include some of these objects, or that some of these objects may move into the field of view of viewfinder 160 and narrow camera 120. With this operation, synthetic objects overlaid on real objects in the viewfinder provide the wearer with enhanced information of the real objects as compared with the view the wearer has of these objects outside of the viewfinder.

Figure 1C:
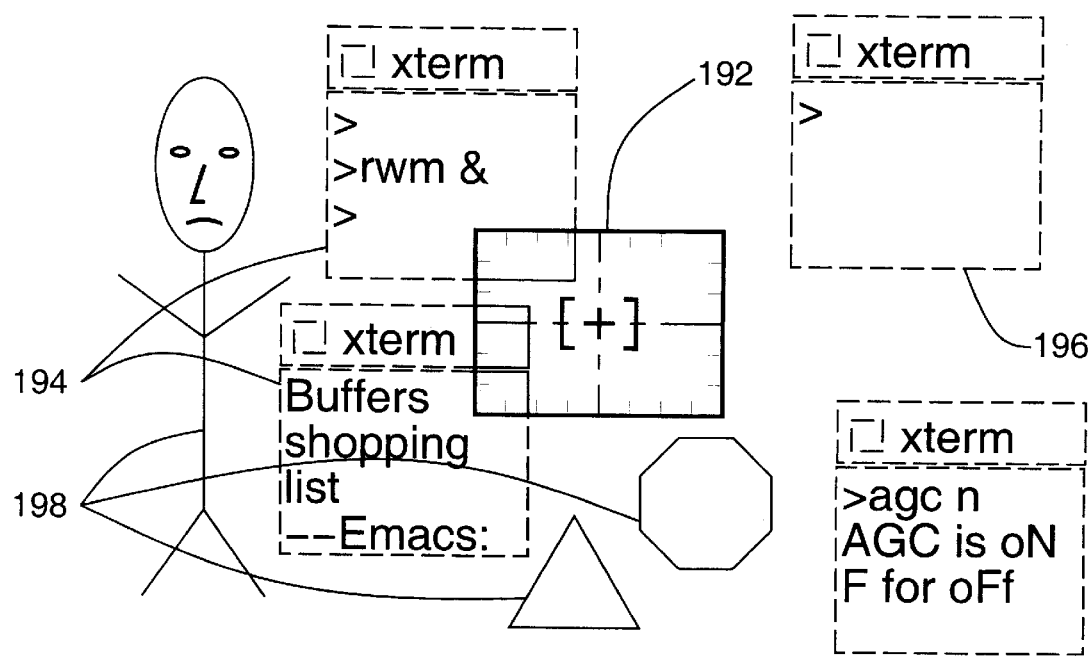
FIG. 1C and FIG. 1D illustrate aspects of the operation of the embodiment of FIG. 1.
Figure 1D:
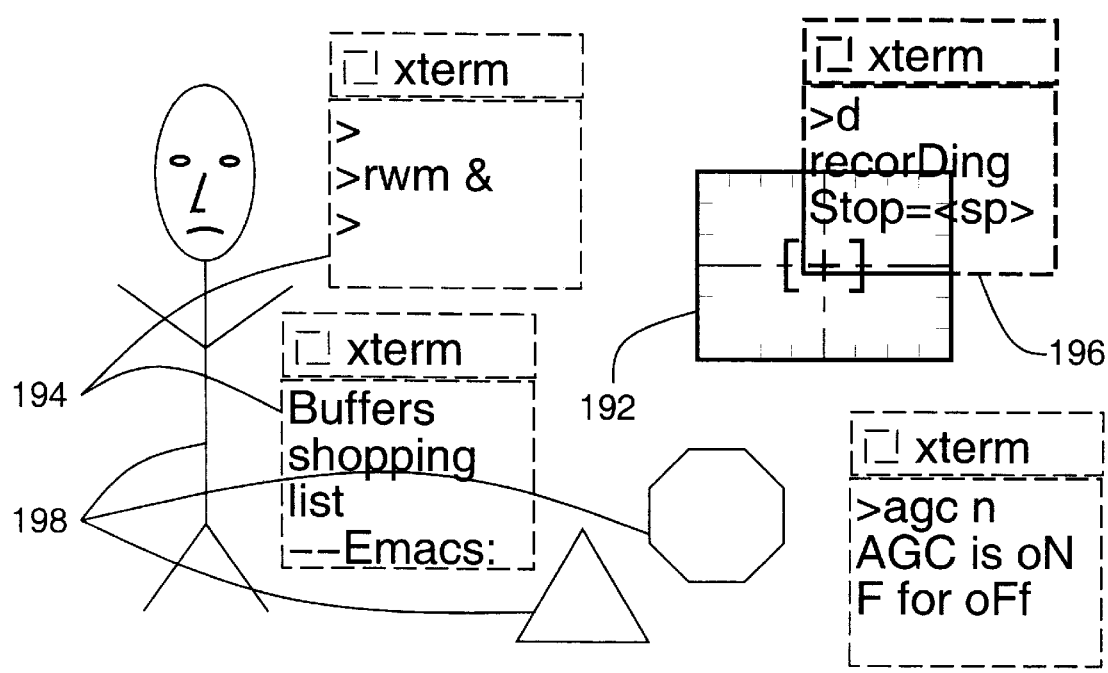

Thus even though television viewfinder screen 160 may only have 240 lines of resolution, a virtual television screens of extremely high resolution, wrapping around the wearer, may be implemented by virtue of the head-tracker, so that the wearer may view very high resolution pictures through what appears to be a small window that pans back and forth across the picture by the head-movements of the wearer. Optionally, in addition to overlaying synthetic objects on real objects to enhance real objects, graphics synthesis processor 182 (FIG. 1b) may cause the display of other synthetic objects on the virtual television screen. For example, FIG. 1c illustrates a virtual television screen with some virtual (synthetic) objects such as an Emacs Buffer upon an xterm (text window in the commonly-used X-windows graphical user-interface). The graphics synthesis processor 182 causes the viewfinder screen 160 (FIG. 1) to display a reticle seen in the viewfinder window at 192. Typically viewfinder screen 160 has 640 pixels across and 480 down, which is only enough resolution to display one xterm window since an xterm window is typically also 640 pixels across and 480 down (sufficient size for 24 rows of 80 characters of text). Thus the wearer can, by turning the head to look back and forth, position viewfinder reticle 192 on top of any of a number of xterms 194 that appear to hover in space above various real objects 198. The real objects themselves, when positioned inside the mediation zone established by the viewfinder, may also be visually enhanced as seen through the viewfinder. Suppose the wearer is in a department store and, after picking up a $7 item for purchase, the wearer approaches the cashier, hands the cashier a $20 dollar bill, but only receives change for a $10 bill (e.g. only receives $3 change from $20). Upon realizing this fact a minute or so later, the wearer locates a fresh available, (e.g. one that has no programs running in it so that it can accept commands) xterm 196. The wearer makes this window active by head movement up and to the right,. as shown in FIG. 1d. Thus the camera functions also as a head tracker, and it is by orienting the head (and hence the camera) that the cursor may be positioned. Making a window active in the X-windows system is normally done by placing the mouse cursor on the window and possibly clicking on it. However, having a mouse on a wearable camera/computer system is difficult owing to the fact that it requires a great deal of dexterity to position a cursor while walking around. With the invention described here, the viewfinder is the mouse/cursor: the wearer's head is the mouse, and the center of the viewfinder is the cursor. In FIG. 1c and FIG. 1d, windows outside the viewfinder are depicted in dashed lines, because they are not actually visible to the wearer. The wearer can see real objects outside the field of view of the viewfinder (either through the remaining eye, or because the viewfinder permits one to see around it). However only xterms in the viewfinder are visible. Portions of the xterms within the viewfinder are shown with solid lines as this is all that the wearer will sec.

Once the wearer selects window 196 by looking at it, then the wearer presses the letter "d" to begin "recorDing", as indicated on window 196. Note that the letter "d" is pressed for "recorD", because the letter "r" means "Recall" (in some ways equivalent to "Rewind" on a traditional video cassette recorder). Letters are typically selected by way of a small number of belt-mounted switches that can be operated with one hand, in a manner similar to the manner that courtroom stenographers use to form letters of the alphabet by pressing various combinations of pushbutton switches. Such devices are commonly known as "chording keyboards" and are well known in the prior art. Also note that the wearer did not need to look right into all of window 196: the window accepts commands as long as it is active, and doesn't need to be wholly visible to accept commands.

Recording is typically retroactive, in the sense that the wearable camera system, by default, always records into a 5 minute circular buffer, so that pressing "d" begins recording starting from 5 minutes ago, e.g. starting from 5 minutes before "d" is pressed. This means that if the wearer presses "d" within a couple of minutes of realizing that the cashier short-changed the wearer, then the transaction will have been sucessfully recorded. The customer can then see hack into the past 5 minutes, and can assert with confidence (through perfect photogiaphic/videographic memory Recall, e.g. by pressing "r") to the cashier that a $20 bill was given. The extra degree of personal confidence afforded by the invention typically makes it unnecessary to actually present the video record (e.g. to a supervisor) in order to correct the situation. Of course. if there was a belief that the cashier was dishonest, the customer could file a report or notify authorities while at the same time submitting the recording as evidence. Typically the recording is also transmitted by way of transmitter 186 so that the cashier or other representatives of the department store (such as a department store security guard who might be a close personal friend of the cashier) cannot sieze and destroy the storage medium upon which the recording was made.

Note that here the drawings depict objects moved translationally (e.g. the group of translations specified by two scalar parameters) while in actual practice, virtual objects undergo a projective coordinate transformation in two dimensions, governed by eight scalar parameters, or objects undergo three dimensional coordinate transformations. When the virtual objects are flat, such as text windows, such a user-interface is called a "Reality Window Manager" (RWM).

In using the invention, typically various windows appear to hover above various real objects, and regardless of the orientation of the wearer's head (position of the viewfinder), the system sustains the illusion that the virtual objects 194 (in this example, xterms) are attached to real objects 198. The act of panning the head back-and forth in order to navigate around the space of virtual objects also may cause an extremely high-resolution picture to be acquired through appropriate processing of a plurality of pictures captured on narrow-camera 120. This action mimicks the function of the human eye, where saccades are replaced with head movements to sweep out the scene using the camera's light-measurement ability as is typical of PEAOCIGRAPHIC imaging. Thus head movements are used to direct the camera to scan out a scene in the same way that eyeball movemerts normally orient the eye to scan out a scene.

Processor 182 is typically responsible for ensuring that the view rendered in graphics processor 185 matches the viewing position of the eve in front of optics 150, and not the original position from which the video was presented from cameras 110 and 120 to vision processor 183. Thus there is a change of viewing angle, in the rendering, so as to compensate for the difference in position (parallax) between the cameras and the view afforded by the display.

Some homographic and quantigraphic image aiialysis embodiments do not require a 3-D scene analysis, and instead use 2-D projective coordinate transformations of a flat object or flat surface of an object, in order to effect the parallax correction between virtual objects and the view of the scene as it would appear with the glasses removed from the wearer.

A drawback of the apparatus depicted in FIG. 1 is that the optical elements 150 block the eye(s) of the wearer. The wearer may be able to adapt to this condition. or at least compensate for it through the display of video from the wearable camera to create an illusion of transparency, in the same way that a hand-held camcorder creates an illusion of transparency when it is on and running even though it would function as a vision-blocking eye patch when turned off. However, because of the parallax between cameras 110 and 120 and the actual eye position given by viewfinder optics 150, creating the illusion of transparency requires parsing all objects through the analysis processor 183, followed by the synthesis processor 185, and this may present processor 182 with a formidable task. Moreover, the fact that the eye of the wearer is blocked means that others cannot make eye-contact with the wearer. In social situations this creates an unnatural form of interaction. Although the lenses of the glasses may be made sufficiently dark that the viewfinder optics are concealed, it is preferable that the viewfinder optics may be concealed in eyeglasses that allow others to see both of the wearer's eves. A beamsplitter may be used for this purpose, but it is preferable that there be a strong lens directly in front of the eye of the wearer to provide for a wide field of view. While a special contact lens might be worn for this purpose. there are limitations on how short the focal length of a contact lens can be, and such a solution is inconvenient for other reasons.

Figure 2:
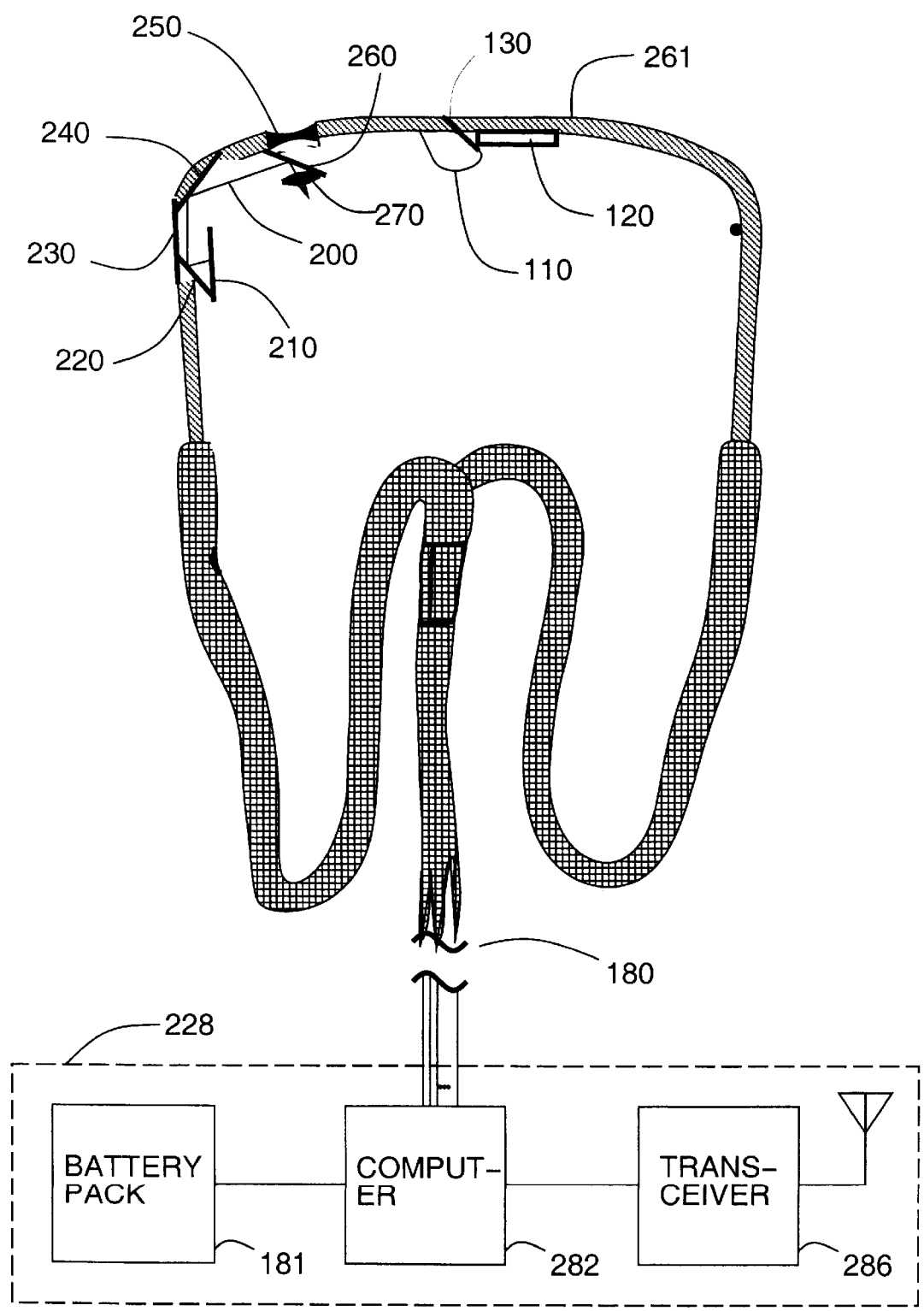
FIG. 2 is a diagram of the wearable camera system with an improvement in which the viewfinder is constructed so that when other people look at the wearer of the apparatus they can see both of the wearer's eves in such a way that they do not notice any unusual magnification of the wearer's left eve which might otherwise look unusual or become a problem in making normal eve contact with the wearer.

Accordingly, a viewfinder system is depicted in FIG. 2 in which an optical path 200 brings light from a viewfinder screen 210, through a first relay mirror 220, along a cavity inside the left temple-side piece of the glasses formed by an opaque side shield 230, or simply by hollowing out a temple side-shield. Light travels to a second relay mirror 240 and is combined with light from the outside environment as seen through diverging lens 250. The light from the outside and from the viewfinder is combined by way of beamsplitter 260. The rest of the eyeglass lenses 261 are typically tinted slightly to match the bearnsplitter 260 so that other people looking at the wearer's eyes do not see a dark patch where the bearnsplitter is. Converging lens 270 magnifies the image from the viewfinder screen 210, while canceling the effect of the diverging lens 250. The result is that others can look into the wearer's eyes and see both eyes at normal magnification, while at the same time, the wearer can see the camera viewfinder at increased magnification. The rest of the system of FIG. 2 is similar to that of FIG. 1 (and like parts have been given like reference numerals ill their last two digits), except that the video transmitter 186 shown in FIG. 1 has been replaced with a data communications transceiver 286. Transceiver 286 along with appropriate instructions loaded into computer 282 provides a camera system allowing collaboration between the user of the apparatus and one or more other persons at remote locations. This collaboration may be facilitated through the manipulation of shared virtual objects such as cursors, or computer graphics renderings displayed upon the camera viewfinder(s) of one or more users.

Similarly, transceiver 286, with appropriate instructions executed in computer 282, allows multiple users of the invention, whether at remote locations or side-by-side, or in the same room within each other's field of view, to interact with one another through the collaborative capabilities of the apparatus. This also allows multiple users, at remote locations, to collaborate in such a way that a virtual environment is shared in which camera-based head-tracking of each user results in acquisition of video and subsequent generation of virtual information being made available to the other(s).

Multiple users, at the same location, may also collaborate in such a way that multiple camera viewpoints may be shared among the users so that they can advise each other on matters such as composition, or so that one or more viewers at remote locations can advise one or more of the users on matters such as composition or camera angle.

Multiple users, at different locations, may also collaborate on an effort that may not pertain to photography or videography directly, but an effort nevertheless that is enhanced by the ability for each person to experience the viewpoint of another.

It is also possible for one or more remote participants at conventional desktop computers or the like to interact with one or more users of the camera system, at one or more other locations, to collaborate on an effort that may not pertain to photography or videography directly, but an effort nevertheless that is enhanced by the ability for one or more users of the camera system to either provide or obtain advice from or to another individual at a remote location.

The embodiments of the wearable camera system depicted in FIG. 1 and FIG. 2 give rise to a small displacement between the actual location of the camera, and the location of the virtual image of the viewfinder. Therefore, either the parallax must be corrected by a vision system 183, followed by 3-D coordinate transformation (e.g. in processor 184), followed by re-rendering (e.g. in processor 185), or if the video is fed through directly, the wearer must learn to make this compensation mentally. When this mental task is imposed upon the wearer, when performing tasks at close range, such as looking into a microscope while wearing the glasses, there is a discrepancy that is difficult to learn, and may also give rise to unpleasant psychophysical effects such as nausea or "flashbacks". Initially when wearing the glasses, the tendency is to put the microscope eyepiece up to one eye, rather than the camera 110 which is right between the eyes. As a result, the apparatus; fails to record exactly the wearer's experience, until the wearer can learn that the effective eve position is right in the middle. Locating the cameras elsewhere does not help appreciably, as there will always be some error. It is preferred that the apparatus will record exactly the wearer's experience. Thus if the wearer looks into a microscope, the glasses should record that experience for others to observe vicariously through the wearer's eye. Although the wearer can learn the difference between the camera position and the eye position, it is preferable that this not be required, for otherwise, as previously described, long-term usage may lead to undesirable flashback effects.

Figure 3:
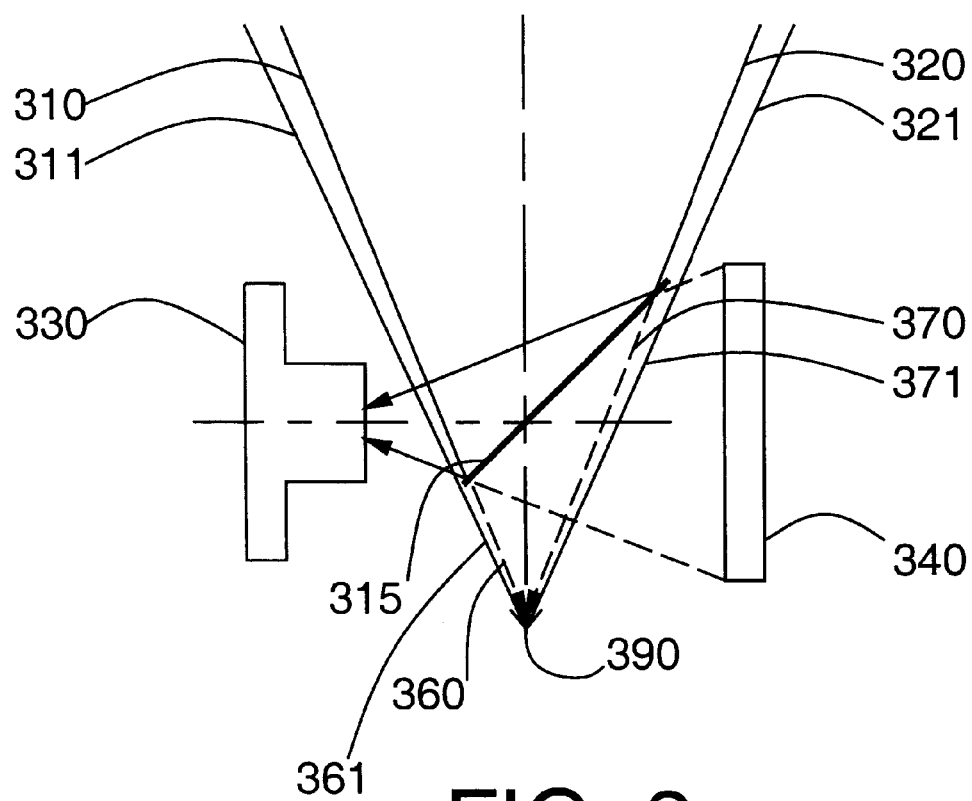
FIG. 3 illustrates the principle of a camera, viewfinder which replaces a portion of the visual field of view with the view from a camera, yet allows the wearer to see through the apparatus without experiencing any psychophysical adaptation or coordinate transformation.

Accordingly. FIG. 3 illustrates a system whereby rays of light spanning a visual angle from ray, 310 to ray 320 enter the apparatus and are intercepted by a two-sided mirror 315, typically mounted at a 45 degree angle with respect to the optical axis of a camera 330. These rays of light enter camera 330. Camera 330 may be a camera that is completely (only) electronic, or it may be a hybrid camera comprising photographic emulsion (film) together with a video tap, electronic previewer, or other manner of electronic output, so that a film may be exposed and the composition may also be determined by monitoring an electronic output signal. Such a camera that provides an electronic output signal from which photographic, videographic, or the like, composition can be judged, will be called an "electronic camera" regardless of whether it may also contain other storage media such as photographic film. The video output of the camera 330 is displayed upon television screen 340 possibly after having been processed on a body-worn computer system or the like. A reflection of television screen 340 is seen in the other side of mirror 315, so that the television image of ray 310 appears as virtual ray 360 and the television image of ray 320 appears as ray 370. Since the camera 330 records an image that is backwards, a backwards image is displayed on the television screen 340. Since the television 340 is observed in a mirror, the image is reversed again so that the view seen at pencil of light rays 390 is not backwards. In this way a portion of the wearer's visual field of view is replaced by the exact same subject matter, in perfect spatial register with the real world as it would appear if the apparatus were absent. Thus the portion of the field of view spanned by rays 310 to 320 which emerges as virtual light, will align with the surrounding view that is not mediated by the apparatus, such as rays 311 and 321 which pass through the apparatus and enter directly into the eye without being deflected by two-sided mirror 315. The image could, in principle also be registered in tonal range, using the PENCIGRAPHY framework for estimating the unknown nonlinear response of the camera, and also estimating the response of the display, and compensating for both. So far focus has been ignored, and infinite depth-of-field has been assumed. In practice, a viewfinder with a focus adjustment is used, and the focus adjustment is driven by a servo mechanism controlled by an autofocus camera. Thus camera 330 automatically focuses on the subject matter of interest, and controls the focus of viewfinder 330 so that the apparent distance to the object is the same while looking through the apparatus as with the apparatus removed.

It is desirable that embodiments of the wearable camera system comprising manual focus cameras have the focus of the camera linked to the focus of the viewfinder so that both may be adjusted together with a single knob. Moreover, a camera with zoom lens may be used together with a viewfinder having zoom lens. The zoom mechanisms are linked in such a way that the viewfinder image magnification is reduced as the camera magnification is increased. Through this appropriate linkage, any increase in magnification by the camera is negated exactly by decreasing the apparent size of the viewfinder image.

The calibration of the autofocus zoom camera and the zoom viewfinder may be done by temporarily removing the mirror 315 and adjusting the focus and zoom of the viewfinder to maximize video feedback. This must be done for each zoom setting, so that the zoom of the viewfinder will properly track the zoom of the camera. By using video feedback as a calibration tool, a computer system may monitor the video output of the camera while adjusting the viewfinder and generating a lookup table for the viewfinder settings corresponding to each camera setting. In this way, calibration may be automated during manufacture of the wearable camera system.

Figure 4:
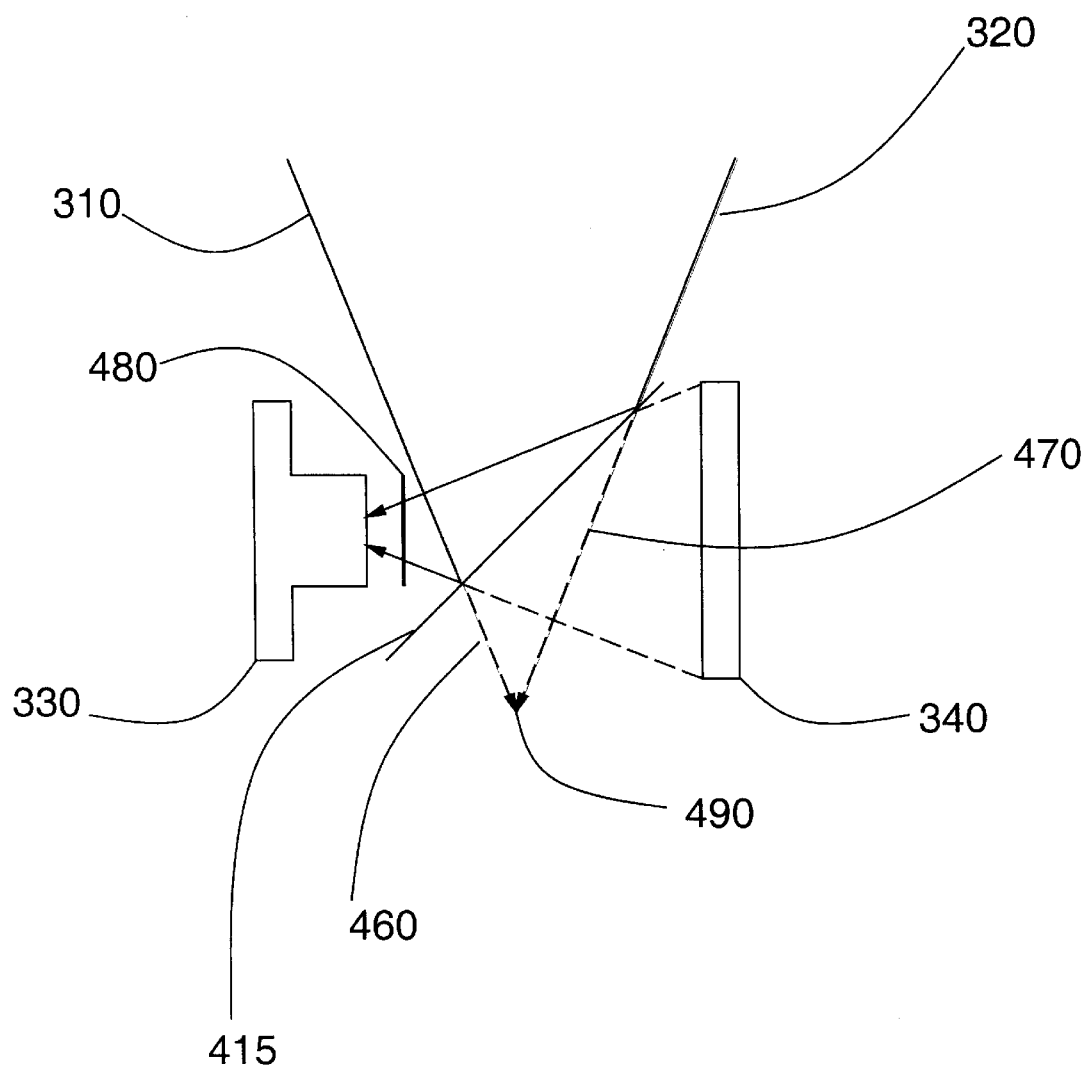
FIG. 4 illustrates a version of the apparatus similar to that in FIG. 1. except where a portion of the visual field of view is only partially replaced, owing to the use of polarizers to prevent video feedback, as well as a beamsplitter rather than a double-sided mirror.

The apparatus of FIG. 3 does not permit others to make full eye-contact with the wearer. Accordingly, FIG. 4 depicts a similar apparatus in which only a portion of the rays of the leftmost ray of light 310 is deflected by beamsplitter 415 which is installed in place of mirror 315. The visual angle subtended by incoming light ray 310 to light ray 320 is deflected by way of beamrsplitter 415 into camera 330. Output from this camera is displayed on television 340, possibly after processing on a body-worn computer or processing at one or more remote sites or a combination of local and remote image processing or the like. A partial reflection of television 340 is visible to the eye of the wearer by way of beamsplitter 415. The leftmost ray of light 460 of the partial view of television 340 is aligned with the direct view of the leftmost ray of light 310 from the original scene. Thus the wearer sees a superposition of whatever real object is located in front of ray 310 and the television picture of the same real object at the same location. The rightmost ray of light 320 is similarly visible through the beamsplitter 415 in register with the rightmost virtual ray reflected off the beamsplitter 415.

Note that the partial transparency of beamsplitter 415 allows one to see beyond the screen, so it is not necessary to carefully cut beamsplitter 415 to fit exactly the field of view defined by television 340, or to have the degree of silvering feather out to zero at the edges beyond the field of view defined by television 340.

Rays 460 and 470 differ from rays 360 and 370 in that 460 and 470 present the viewer with a combination of virtual light an(d real light. In order to prevent video feedback, in which light from the television screen would shine into the camera, a polarizer 480 is positioned in front of the camera. The polarization axis of the polarizer is aligned at right angles to the polarization axis of the polarizer inside the television assuming the television already has a built-in polarizer as is typical of small battery powered LCD televisions, LCD camcorder viewfinders, and LCD computer monitors. If the television does not have a built in polarizer, a polarizer is added in front of the television. Thus video feedback is prevented by virtue of the two crossed polarizers in the path between the television 340 and the camera 33). The pencil of rays of light 490 will provide a mixture of direct light from the scene, and virtual light from the television display 340. The pencil of rays 490 thus differs from the pencil of rays 390 (FIG. 3) in that 490 is a superposition of the virtual light as in 390 with real light from the scene.

In describing this invention, the term "pencil"of rays shall be taken to mean rays that intersect at a point in arbitrary dimensions (e.g. 3D) as well as 2D) even though the term "pencil" usually only so-applies to 2D in common usage. This will simplify matters (rather than having to use the word "bundle" in 3D and "pencil" in 2D).

It is desired that both the real light and virtual light be in perfect or near perfect registration. However, in order that the viewfinder provide a distinct view of the world, it may be desirable that the virtual light from the television be made different in color or the like from the real light from the scene. For example, simply using a black and white television, or a black and red television, or the like, or placing a colored filter over the television, will give rise to a unique appearance of the region of the wearer's visual field of view by virtue of a difference in color between the television image and the real world upon which it is exactly superimposed. Even with such chromatic mediation of the television view of the world, it may still be difficult for the wearer to discern whether or not video is correctly exposed. Accordingly, a pseudocolor image may be displayed, or unique patterns may be used to indicate areas of over exposure or under exposure. Once the wearer becomes aware of areas of improper exposure (such as when an automatic exposure algorithm is failing), the parameters of the automatic exposure algorithm (such as setting of program mode to "backlight", "high contrast", "sports mode" or the like) may be changed, or the automatic exposure may be overridden.

Television 340 may also be fitted with a focusing lens so that it may be focused to the same apparent depth as the real objects in front of the apparatus. A single manual focus adjustment may be used for both camera 430 and television 340 to adjust them both together. Alternatively, an autofocus camera 430 may control the focus of television 340. Similarly, if a varifocal or zoom camera is used, a varifocal lens in front of television 340 should be used, and should be linked to the camera lens, so that a single knob may be used to adjust the zoom setting for both.

The apparatus of FIG. 4 may be calibrated by temporarily removing the polarizer, and then adjusting the focal length of the lens in front of television 340 to maximize video feedback for each zoom setting of camera 430. This process may be automated if desired, for example, using video feedback to generate a lookup table used in the calibration of a servo mechanism controlling the zoom and focus of television 340.

The entire apparatus is typically concealed in eyeglass frames in which the beamsplitter is either embedded in one or both glass lenses of the eyeglasses, or behind one or both lenses. In the case in which a monocular version of the apparatus is being used, the apparatus is built into one lens, and a dummy version of the beamsplitter portion of apparatus may be positioned in the other lens for visual symmetry. These bearnsplitters may be integrated into the lenses in such a manner to have the appearance of ordinary lenses in ordinary bifocal eyeglasses. Moreover, magnification may be unobtrusively introduced by virtue of the bifocal characteristics of such eyeglasses. Typically the entire eyeglass lens is tinted to match the density of the beamsplitter portion of the lens, so there is no visual discontinuity introduced by the beamsplitter.

Figure 5:
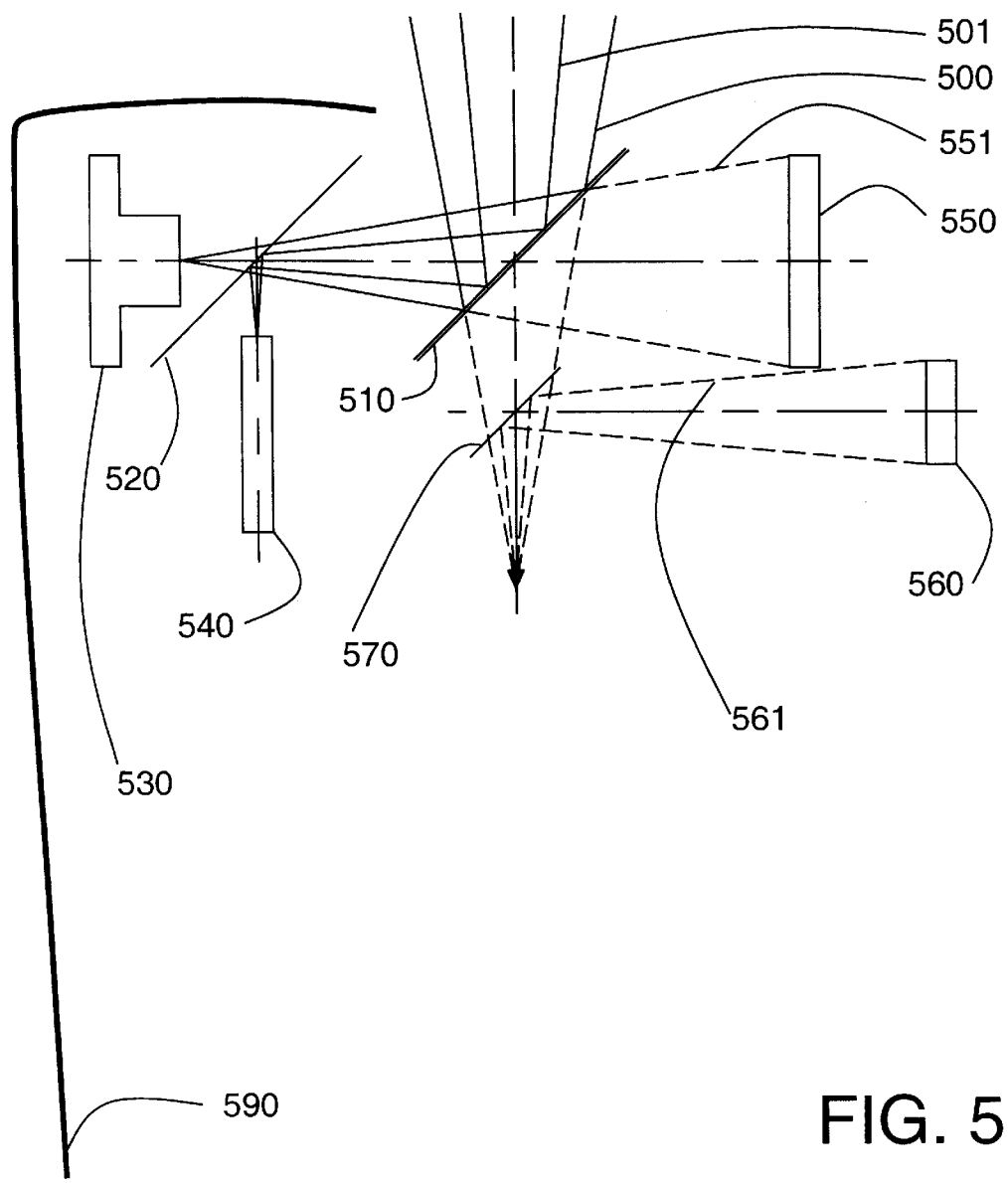
FIG. 5 shows an embodiment of the invention in which there are two televisions of different sizes which are each superimposed upon exactly the field of view that corresponds to each of two cameras, one being wide-angle and the other being tele.

FIG. 5 depicts a foveated embodiment of the invention in which incoming light 500 and 501 is intercepted from the direct visual path through the eyeglasses and directed instead, by double-sided mirror 510 to beamsplitter 520. A portion of this light passes through beamsplitter 520 and is absorbed and quantified by wide-camera 530. A portion of this incoming light is also reflected by beamsplitter 520 and directed to narrow-camera 540. The image from the wide-camera 530 is displayed on a large screen television 550, typically of size 0.7 inches (approx. 18 mm) on the diagonal, forming a wide-field-of-view image of virtual light 551 from the wide-camera. The image from the narrow-camera 540 is displayed on a small screen television 560, typically of screen size ¼ inch (approx. 6 mm) on the diagonal, forming a virtual image of the narrow-camera as virtual light 561.

Real rays of light in the periphery of the mediation zone formed by the apparatus emerge as virtual rays from television 550 only. For example, real ray 500 emerges as virtual ray 551.

Real rays near the central (foveal) region of the mediation zone emerge as virtual rays from both televisions (e.g. they also emerge as virtual rays from television 560). Television 560 subtends a smaller visual angle, and typically has the same total number of scanlines or same total number of pixels as television 550, so the image is sharper in the central (foveal) region. Thus television 560 is visually more dominant in that region, and the viewer can ignore television 550 in this region (e.g. the blurry image and the sharp image superimposed appear as a sharp image in the central region).

Thus, for example, unlike the real light ray 500 which emerges as virtual light from only one of the two televisions (from only television 550), the real light ray 501 emerges as virtual light from both televisions. Only one of the virtual rays collinear with real ray 501 is shown, in order to emphasize the fact that this virtual ray is primarily associated with television 560 (hence the break between where the solid line 501 is diverted by mirror 510 and where the collinear portion continues after mirror 570). This portion of the dotted line between mirror 510 and mirror 570 that is collinear with real light ray 510 has been omitted to emphasize the visual dominance of television 560 over television 550 within the central (foveal) field of view, In this foveal region, it is the virtual light from television 560 that is of interest, as this virtual light will be perceived as more pronounced, since the image of television 560 will be sharper (owing to its more closely packed pixel array or scanlines). Thus even though real light ray 501 emerges as two virtual rays, only one of these, 561, is shown: the one corresponding to television 560.

A smaller television screen is typically used to display the image from the narrow-camera in order to negate the increased magnification that the narrow-camera would otherwise provide, when equal magnification lenses are used for both. In this manner, there is no magnification and both images appear as if the rays of light were passing through the apparatus, so that the virtual light rays align with the real light rays were they not intercepted by the double-sided mirror 510. Television 550 is viewed as a reflection in mirror 510, while television 560 is viewed as a reflection in beamsplitter 570. Note also that the distance between the two televisions 550 and 560 should equal the distance between double-sided mirror 510 and beamsplitter 570 as measured in a direction perpendicular to the optical axes of the cameras. In this way, the apparent distance to both televisions will be the same, so that the wearer experiences a view of the two televisions superimposed upon one-another in the same depth plane. Alternatively, the televisions may be equipped with lenses to adjust their magnifications so that the television displaying the image from the tele camera 540 subtends a smaller visual angle than the television displaying the image from wide camera 530, and so that these visual angles match the visual angles of the incoming rays of light 500. In this way, two television screens of equal size may be used, which simplifies manufacture of the apparatus. Typically, the entire apparatus is built within the frames 590 of a pair of eyeglasses, where cameras 530 and 540, as well as televisions 550 and 560 are concealed within the frames 590 of the glasses, while double-sided mirror 510 and beamsplitter 570 are mounted in, behind, or in front of the lens of the eyeglasses. In some embodiments, mirror 510 is mounted to the front of the eyeglass lens, while beamsplitter 570 is mounted behind the lens. In other embodiments, one or both of mirror 510 and beamsplitter 570 are actually embedded in the glass of the eyeglass lens.

Two-sided mirror 510 may instead be a beamsplitter, or may be fully silvered in places (to make a partial beamsplitter and partial full, silvered two-sided mirror). For example, it may be silvered more densely in the center, where the visual acuity is higher, owing to the second television screen. It may also be feathered out, so that it slowly fades to totally transparent around the edges, so there is not an abrupt discontinuity between the real world view and the portion that has been replaced by virtual light. In this case, it is often desirable to insert the appropriate polarizer(s) to prevent video feedback around the edges.

Figure 6:
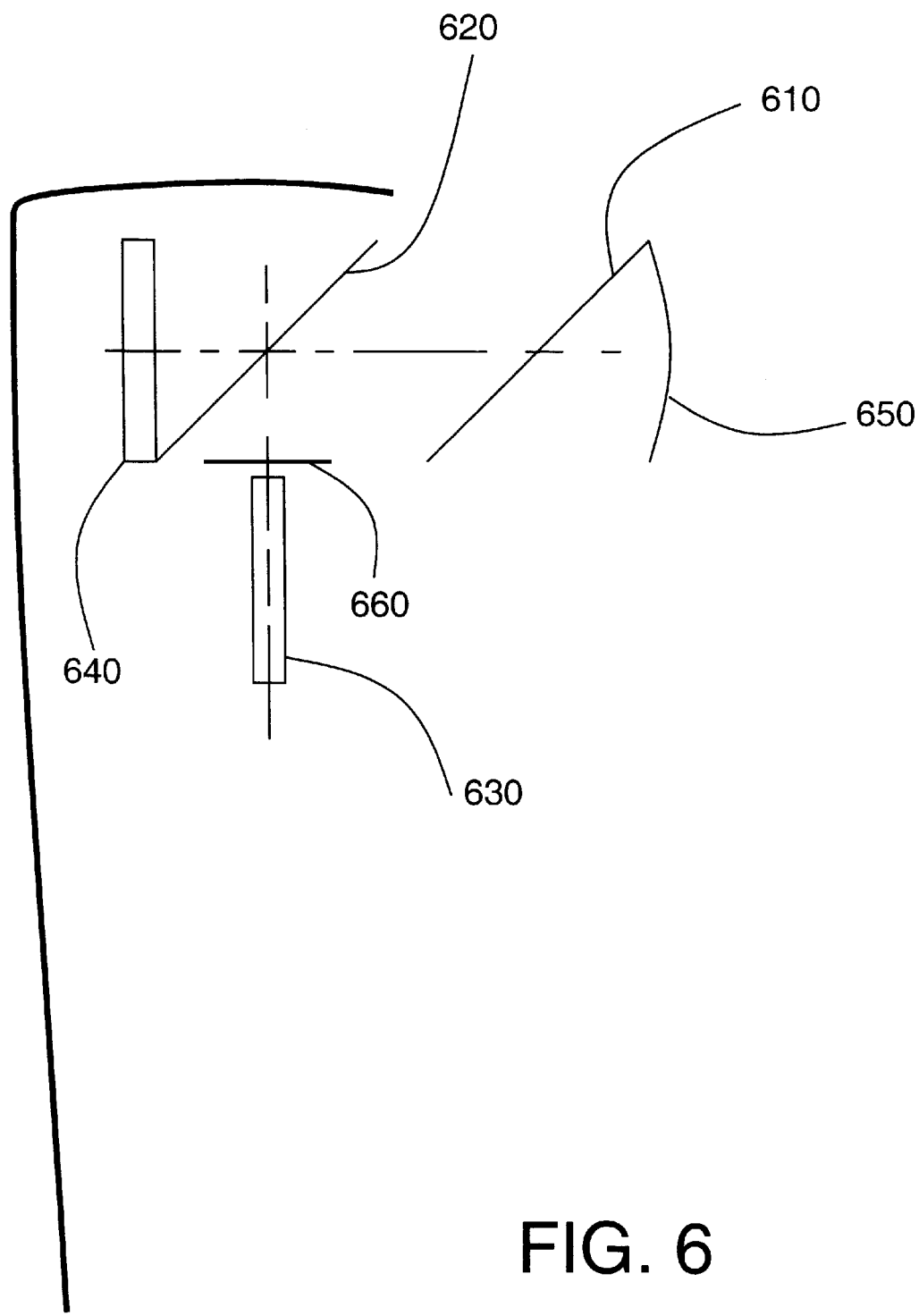
FIG. 6 shows an embodiment of the wearable camera invention in which the viewfinder contains considerable magnification, yet allows other people to see both of the wearer's eyes except for a slight amount of blocked vision which may be concealed by making the glasses look like bifocal glasses.

FIG. 6 depicts an alternate embodiment of the wearable camera invention depicted in FIG. 4 in which both the camera arid television are concealed within the left temple side-piece of the eyeglass frames. A first beamsplitter 610 intercepts a portion of the incoming light and directs it to a second bearnsplitter 620 where some of the incoming light is directed to camera 630 and some is wasted illuminating the television screen 640. However, the screen 640, when presented with a video signal from camera 630 (possibly after being processed by a body-worn computer, or remotely by way of wireless communications, or the like) directs light back through beamsplitter 620, where some is wasted but is absorbed by the eyeglass frame to ensure concealment of the apparatus, and some is directed to beanmsplitter 610. Some of this light is directed away from the glasses and would be visible by others, and some is directed to the curved mirror 650 where it is magnified and directed back toward beamsplitter 610. The portion that is reflected off of beamsplitter 610 is viewed by the wearer, while the portion that continues back toward beamsplitter 620 must be blocked by a polarizer 660 to prevent video feedback. Implicit in the use of polarizer 660 is the notion that the television produces a polarized output. This is true of LCD televisions which comprise a liquid crystal display between crossed polaroids. If the television is of a type that does not already produce a polarized output, an additional polarizer should be inserted in front of television 640. Finally, if it is desired that the apparatus be unobtrusive, an additional polarizer or polarizing beams plitter should be used so that the television 640 is not visible to others by way of its reflection in beamsplitter 610. Alternatively, in certain situations it may actually be desirable to make the display visible to others. For example when the system is used for conducting interviews, it might be desirable that the person being interviewed see himself or herself upon the screen. This may be facilitated by exposing beamsplitter 620 to view, or allowing the reflection of the television to be seen in beamsplitter 610. Alternatively, another television may be mounted to the glasses, facing outwards. Therefore, just as the wearer of an embodiment of the invention may see the image captured by the camera. along with additional information such as text of a teleprompter, the interview(s) may also be presented with an image of themselves so that they appear to be looking into an electronic mirror, or may be teleprompted by this outward-facing display, or both. In some embodiments of the invention, the use of two separate screens was useful for facilitation of an interview in which the same image was presented to both the inward-facing television and the outward-facing television, but the images were mixed with different text. In this way the wearer was teleprompted with one stream of text, while the interviewee was prompted with a different stream of text.

While the optical elements of the camera system of the described embodiments are embedded in eyeglasses, equally these elements may be embedded in other headgear such as a helmet.

The beamsplitter 415 of FIG. 4 and 610 of FIG. 6 could conveniently be implemented as a metallisation within a lens of the eyeglasses. These beamsplitters and diverging lens 250 of FIG. 2 may be embedded within the eyeglass lens below the main optical axis of the eye in its normal position so that the embedded elements may appear to be a feature of bifocal eyeglasses.

Figure 7:
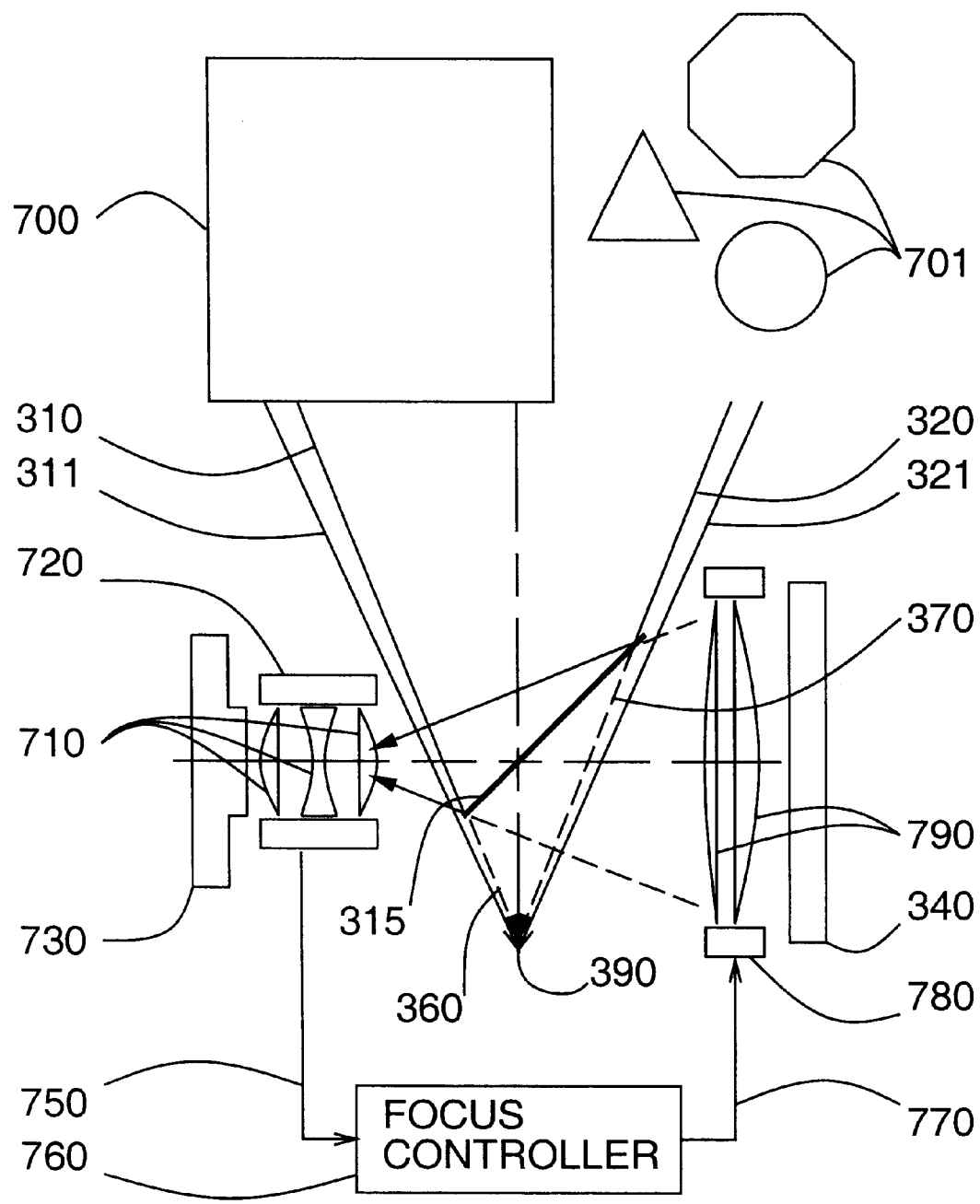
FIG. 7 shows an embodiment of the invention where there is coupling between camera focus and viewfinder focus.

FIG. 7 depicts a wearable camera system with automatic focus. While the system depicted in FIG. 3 may operate with a fixed focus camera 330, so long as it has sufficient depth of field, there is still the question of at what focus depth television 340 will appear. Ideally the apparent depth of the display would match that of objects seen around the display, as represented by rays of light 311, 321, which are beyond two-sided mirror 315. This may be achieved if display medium 340 is such that it has nearly infinite depth of field, for example, by using a scanning laser ophthalmoscope (SLO), or other device which displays an image directly onto the retina of the eye. for display 340, or if display 340 were a holographic video display.

A lower-cost alternative is to use a variable focus display. The primary object(s) of interest, 700 are imaged by lens assembly 710 which is electronically focusable by way of a servo mechanism 720 linked to camera 730 to provide automatic focus. Automatic focus cameras are well known in the prior art, so the details of automatic focus mechanisms will not be explained here. A signal, 750, from the automatic focus camera is derived by way of reading out the position of the servo 720, and this signal 750 is conveyed to a display focus controller (viewfinder focus controller) 760. Viewfinder focus controller 760 drives, by way of focus control signal 770, a servo mechanism 780 which adjusts the focus of viewfinder optics 790. The arrangement of signals and control systems is such that the apparent depth of television screen 340 is the same as the apparent depth at which the primary object(s) of interest in the real scene would appear without the wearable camera apparatus.

Other objects, 701, located in different depth planes, will not be in focus in camera 730, and will thus appear blurry on screen 340. They may appear slightly misaligned with where they would have appeared in the absence of the wearable camera system. The degree of misalignment will depend on eye position—the misalignment may or may not be present, or may be quite small. However, because the objects are out of focus, and are not the primary details of the scene, a small possible misalignment will not be particularly objectionable to the wearer of the apparatus.

In this example, rays 310 and 311 are both in the depth plane of the central object of interest, so that there is no discontinuity between emergent virtual light 360 and real light 311. Thus there is no discontinuity in perceived depth at the leftmost edge of two-sided mirror 315. There is, however, a difference in depth between virtual ray 370 of real ray 320 and almost adjacent real ray 321, because virtual ray 370 is in the same depth plane as 310, 311, and 360, while real ray 321 is in a more distant depth plane owing to the more distant facing surface of objects 701. However, because the eye will be focused on the depth plane of 310, 311, and 360, ray 311 from the real world will be out of focus by virtue of the limited depth of focus of the human eye itself. Thus the real objects will appear blurry, and a discontinuity between these real objects and their blurry image on screen 340 will not be appreciably perceptible.

Figure 8:
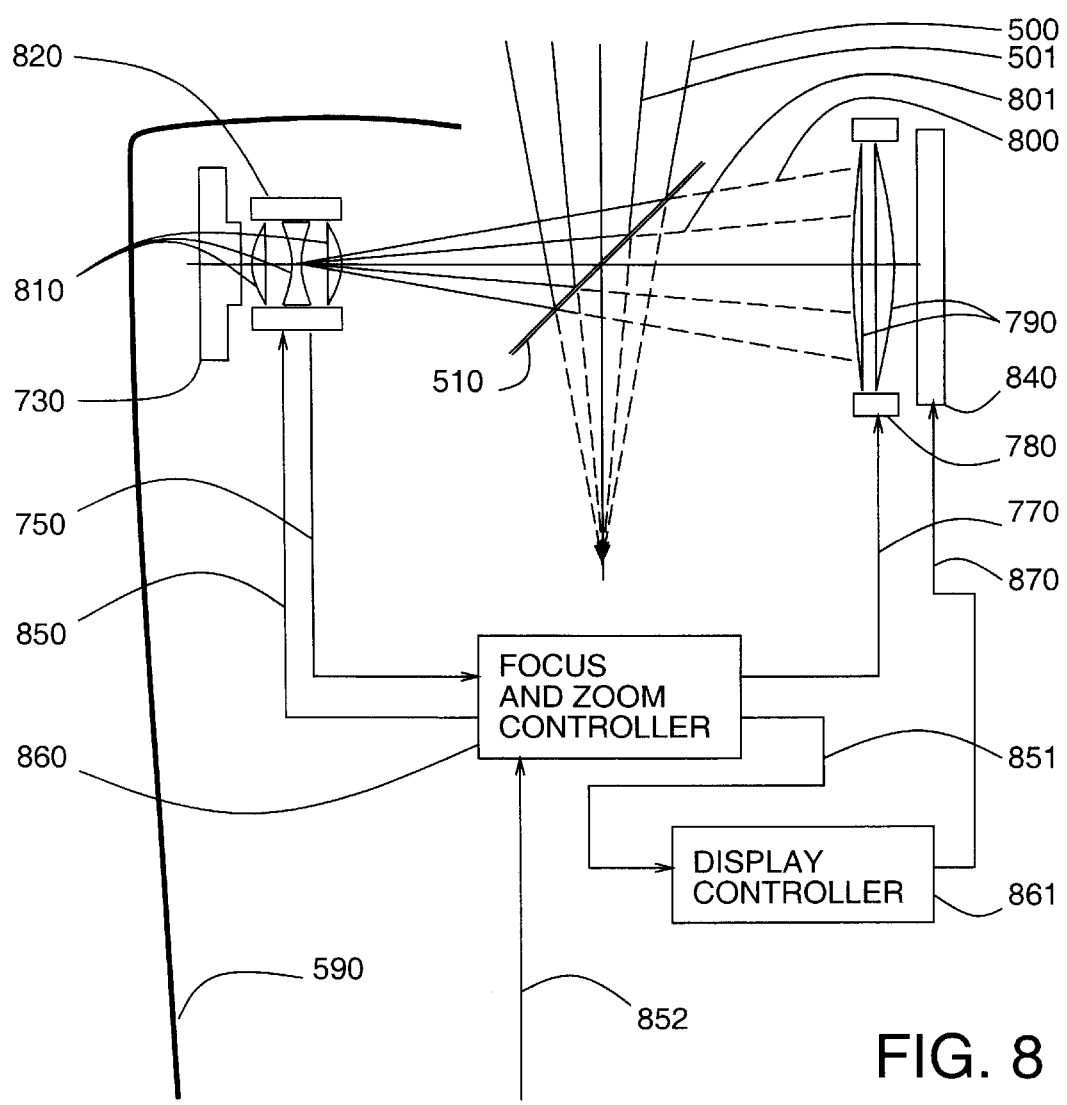
FIG. 8 shows an embodiment of the invention where there is a zoom capability, and where the virtual light principle is preserved regardless of zoom setting.

FIG. 8 depicts an embodiment of the wearable camera systems having a zoom lens. Rays of light, for example, rays 500 and 501, enter the wearable camera system and emerge from display 840 as virtual light rays 800 and 801 respectively. In this process of going from light input to virtual light output, two-sided mirror 510 serves to deflect light to autofocus camera 730. Autofocus camera 730 comprises lens 810 and servo mechanism 820 configured in such a manner as to function as a conventional automatic focus camera functions except that there is, provided to the rest of the system, a signal 750 that indicates the focus setting of the camera 730 and its lens 810 as selected by the camera's control system and servo mechanism 820 and that the camera is also a zoom camera in which the zoom setting can be controlled remotely by zoom signal input 850. Zoom signal input 850 controls, by way of servo 820, the relative position of various optical elements 810, so that in addition to automatic focus, the camera can be given a desired focal length (field of view). The focus signal 750 goes into a focus and zoom controller 860 which accepts a zoom control signal input, 852, from the user, and directs this zoom control signal to the camera by way of signal 850, and also directs an appropriately processed version of this zoom control signal 851 to display controller 861. In this embodiment, display zoom is achieved as an electronic zoom. While camera zoom is achieved optically display zoom is achieved electronically, by way of display controller 861 and display signal 870. The camera zooms in by adjustment of lens 810 for longer focal length, increasing the focal distance from the lens to the sensor array in camera 730, resulting in increased magnification. This increase in magnification is accompanied by a decrease, by operation of display controller 861, of the image size displayed on television 840. Television 840 may differ from television 340 (of FIG. 7) in the sense that television 840 is optimized for display of resampled (electronically resized) images. This reduction in image size cancels out what would otherwise be an increase in magnification when zooming in with camera 730. It is this precisely controlled cancellation of any magnification that ensures that rays of light entering the apparatus are collinear with rays of virtual light emerging from the other side of the apparatus.

Figure 9:
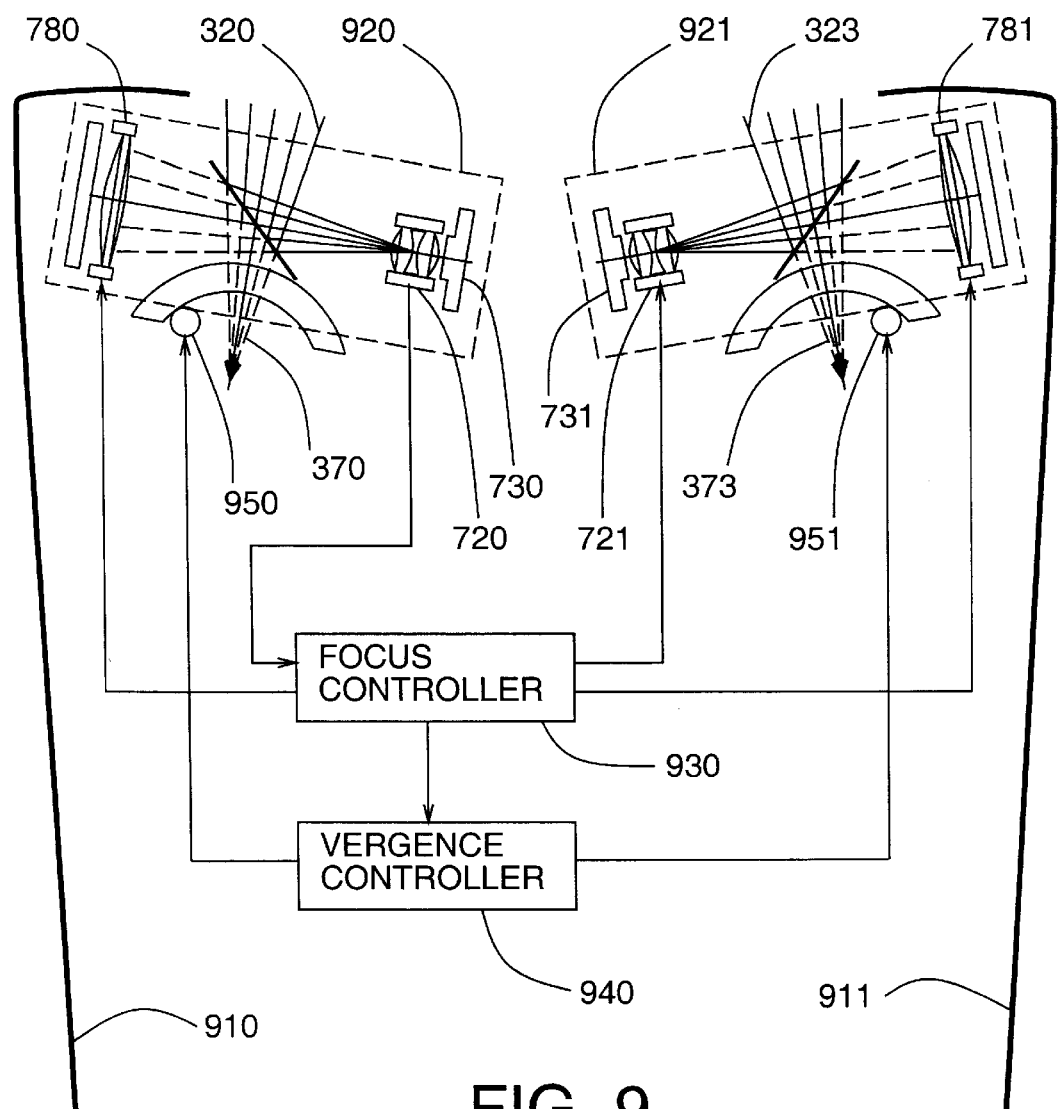
FIG. 9 shows a stereo embodiment of the invention where both cameras are focused by the left camera, and where the left camera also controls the focus of both viewfinders and the vergence of the entire system.

FIG. 9 depicts a stereo embodiment of the wearable camera system. An eyeglass frame comprising left temple side-piece 910 and right temple side-piece 911 contains two complete assemblies, 920 and 921, each one similar to the entire assembly depicted in FIG. 7 or FIG. 8.

Rays of light, for example, ray 320, enter the left eye assembly 920, and emerge as rays of virtual light for example, 370. As a result, a focus of autofocus camera 730 results, by virtue of the main object of interest before assembly 920. The autofocus camera 730 includes a servo mechanism 720, and the control voltage that the camera feeds to this servo mechanism to keep the camera in focus is also sent outside assembly 920 to focus controller 930. Focus controller 930 drives camera 731 inside the right eye assembly 921. Camera 731 is not an autofocus camera, but, instead is a remotely focusable camera. By remotely focusable, what is meant is that rather than having its servo mechanism 721 driven by the camera itself, as it hunts for best focus, the servo mechanism is instead driven by an external signal. This external signal comes from the camera 730 in the left eve assembly 920. The reason for not having two independently automatically focusing cameras is that it is desired that both cameras will focus in the same depth plane irrespective of slight errors that might be present in the focus of either one.

Focus controller 930 also sets the focus of both left and right viewfinders by controlling left viewfinder lens servo 750 and right viewfinder lens servo 781. Moreover, focus controller 930 sends a signal to vergence controlled 940 which drives servo mechanism 950 to adjust the vergence of left eye assembly 920 and servo mechanism 951 to adjust the vergence of right eye assembly 921.

In this embodiment, the focus of both cameras, the focus of both displays, and the vergence of both assemblies are all controlled by the focus of the left camera, so that whatever object the left camera focuses itself onto, will define the depth plane perceived by both eyes looking at their respective displays. This depth plane will also correspond to the vergence of the displays, so that depth and disparity will match at all times.

Figure 10:
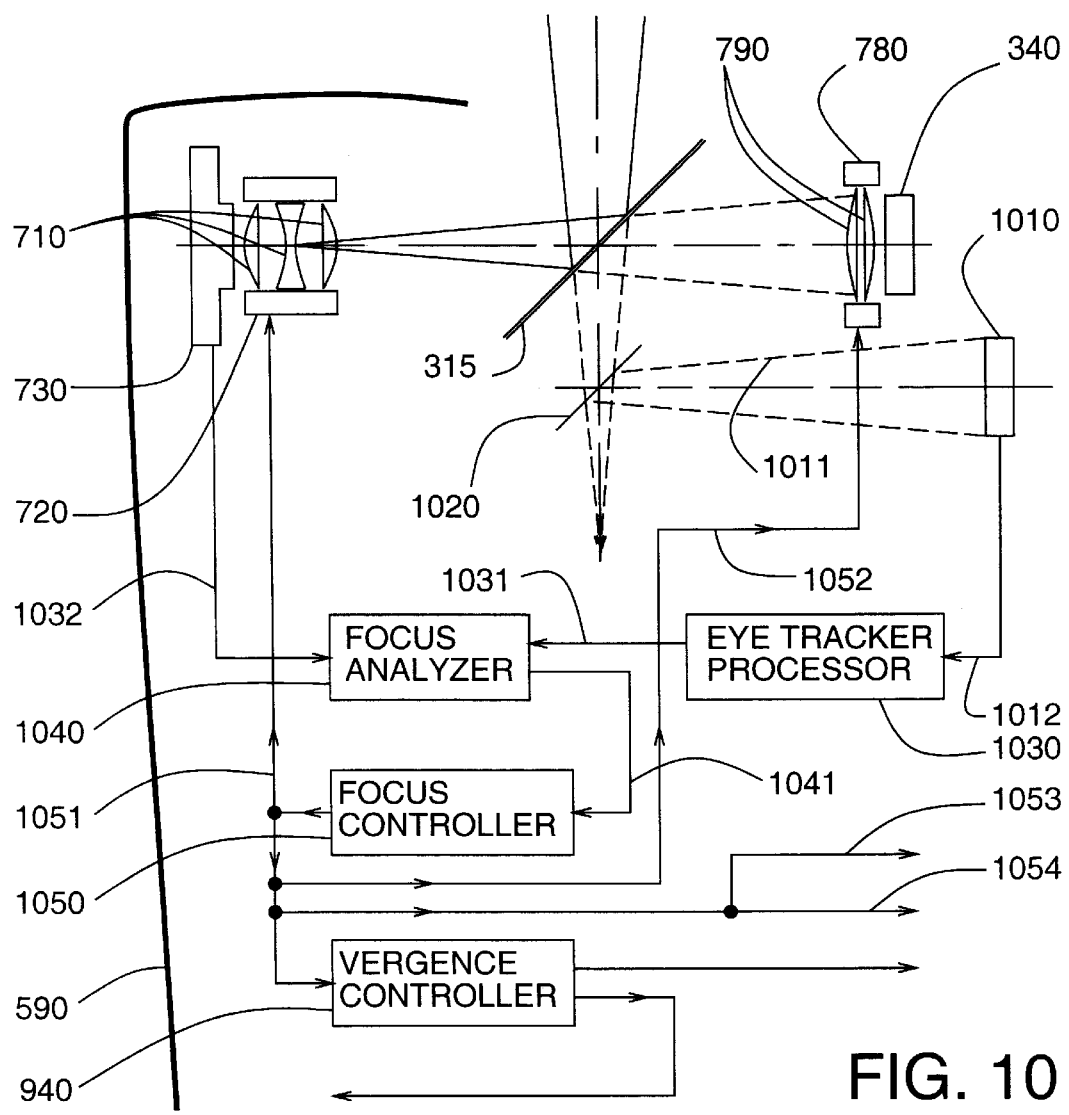

FIG. 10 depicts the left eye portion of an embodiment of the wearable camera system where the camera focus and vergence are driven by the output of an eyetracker. Eyetracker assembly 1010 (comprising camera and infrared light sources) illuminates and observes the eyeball by way of rays of light 1011 that partially reflect off beamsplitter 1020. Beamsplitter 1020 also allows the wearer to see straight through to mirror 315 and thus see virtual light from viewfinder 340. The eyetracker 1010 reports the direction of eye gaze and conveys this information as a signal 1012 to eye tracker processor 1030 which converts this direction into "X" and "Y" coordinates that correspond to the screen coordinates of viewfinder screen 340. These "X" and "Y" coordinates, which are expressed as signal 1031, indicate where on the viewfinder screen 340 the wearer is looking. Signal 1031 and the video output 1032 of camera 730 are both passed to focus analyzer 1040. Focus analyzer 1040 selects a portion of the video signal 1032 in the neighbourhood around the coordinates specified by signal 1031. In this way, focus analyzer 1040 ignores video except in the vicinity of where the wearer of the apparatus is looking. Because the coordinates of the camera match the coordinates of the display (by way of the virtual light principle), the portion of video analyzed by focus analyzer 1040 corresponds to where the wearer is looking. The focus analyzer 1040 examines the high-frequency content of the video in the neighbourhood of where the wearer is looking, to derive an estimate of how well focused that portion of the picture is. This degree of focus is conveyed by way of focus sharpness signal 1041 to focus controller 1050 which drives, by way of focus signal 1051, the servo mechanism 720 of camera 730. Focus controller 1050 is such that it causes the servo mechanism 720 to hunt around until it sharpness signal 1041 reaches a global or local maximum.

The focus analyzer 1040 and focus controller 1050 thus create a feedback control system around camera 730 so that it tends to focus on whatever object(s) is (are) in the vicinity of camera and screen coordinates 1031. Thus camera 730 acts as an automatic focus camera, but instead of always focusing on whatever is in the center of its viewfinder, it focuses on whatever is being looked at by the left eye of the wearer.

In addition to driving the focus of the left camera 730, focus controller 1050 also provides a control voltage 1052 identical to the control voltage of 1051. Control signal 1052 drives servo mechanism 780 of lens 790, so that tile apparent depth of the entire screen 340 appears focused at the same depth as whatever object the wearer is looking at. In this way, all objects in the viewfinder appear in the depth plane of the one the wearer is looking at.

Focus controller 1050 provides further control voltages, 1053 and 1054 for the right eye camera and right eye viewfinder, where these signals 1053 and 1054 are identical to that of 1051. Moreover, focus controller 1050 provides the same control voltage to the vergence controller 940 so that it can provide the control signal to angle the left and right assemblies inward by the correct amount, so that all focus and vergence controls are based on the depth of the object the left eye is looking at. It is assumed left and right eyes are looking at the same object, as is normal for any properly functioning human visual system.

In other embodiments of the invention, it may be desired to know which object is of interest when there are multiple objects in the same direction of gaze, as might happen when the wearer is looking through a dirty glass, window. In this case there are three possible objects of interest: the object beyond the window, the object reflected in the glass, and the dirt on the window. All three may be at different depth planes but in the same gaze direction.

An embodiment of the wearable camera system with a human-driven autofocus camera (e.g. driven by eye focus), could be made from an eye tracker that would measure the focus of the wearer's left eye. Preferably, however, two eyetrackers may be used, one on the left eye, and one on the right eye, in order to attempt to independently track each eye and attempt to obtain a better estimate of the desired focus by way of the vergence of the wearer's eyes.

A reality window manager (RWM), similar to that depicted in FIG. 1*c* and FIG. 1*d*, may also be driven by the eyetracker, so that there can be an independent head position (framing) and cursor position (where looking), rather than always having the cursor in the center of the viewfinder. This arrangement would also facilitate movement of the cursor without moving the head, which may reduce head movements that appear unnatural to others watching the user of the wearable camera system.

The apparatus of this invention allows the wearer to experience the camera over a long period of time. For example, after wearing the apparatus sixteen hours per day for several weeks, it begins to function as a true extension of the mind and body. In this way, photographic composition is much more optimal, because the act of taking pictures or shooting video no longer requires conscious thought or effort. Moreover, the intentionally of the picture-taking process is not evident to others, because picture-taking is not preceeded by a gesture such as holding a viewfinder object up to the eye. The wearable viewfinder is an important element of the wearable camera invention allowing the wearer to experience everyday life through a screen, and therefore be always ready to capture anything that might happen, or even anything that might have happened previously by virtue of the retroactive record capability of the invention. Moreover, additional information beyond just exposure and shutter speed may be displayed in the camera viewfinder. For example., the camera allows the wearer to augment, diminish, or otherwise alter his or her perception of visual reality. This mediated-reality experience may be shared. The wearer may allow others to alter his or her perception of reality. In this way the invention is useful as a new communications medium, in the context of collaborative photography, collaborative videography, and telepresence. Moreover, the invention may perform other useful tasks such as functioning as a personal safety device arid crime deterrent by virtue of its ability to maintain a video dairy transmitted and recorded at multiple remote locations. As a tool for photojournalists and reporters, the invention has clear advantages over other competing technologies.

From the foregoing description, it will thus be evident that the present invention provides a design for a, wearable camera with a viewfinder. As various changes can be made in the above embodiments and operating methods without departing from the spirit or scope of the invention, it is intended that all matter contained in the above description or shown in the accompanying drawings should be interpreted as illustrative and not in a limiting sense.

Variations or modifications to the design and construction of this invention, within the scope of the invention, may occur to those skilled in the art upon reviewing the disclosure herein. Such variations or modifications, if within the spirit of this invention, are intended to be encompassed within the scope of any claims to patent protection issuing upon this invention.

What is claimed is:

1. Camera bearing headgear, comprising:

an electronic camera borne by said headgear;

an electronic display for providing a viewfinder for said electronic camera, said electronic display:
- responsive to an electronic output from said electronic camera;
- borne by said headgear;
- positioned such that an optical axis of said camera is perpendicular to an
- optical axis of said display; and
- having a polarizer;

a mirror arranged for diverting light that would otherwise enter an eye of a wearer to said camera and for diverting light emitted from said display to said eye of said wearer such that diverted light from said display is collinear with said light that would otherwise enter said eye of said wearer;

a first beamsplitter, said first beamsplitter positioned between said mirror and said eye of said wearer;

a second beamsplitter interposed along said optical axes and making a 45° angle with said optical axes; and a further polarizer in front of said camera oriented to block polarized light emitted by said display.

2. Camera bearing headgear, comprising:

an electronic camera borne by said heads ear;

an electronic display for providing a viewfinder for said electronic camera, said electronic display:
- responsive to an electronic output from said electronic camera;
- borne by said head gear;

optics including a beamsplitter such that light emitted from said display passes through said beamsplitter at least once before travelling away from said beamsplitter and then back toward said beamsplitter and being reflected off said beamsplitter toward an eye of a wearer.

3. The headgear of claim 2 where said display includes a polarizer.

4. The headgear of claim 2 where said beamsplitter comprises a dichroic beamsplitter with polarization properties.

* * * * *

UNITED STATES PATENT AND TRADEMARK OFFICE
CERTIFICATE OF CORRECTION

PATENT NO. : 6,307,526 B1
DATED : October 23, 2001
INVENTOR(S) : W. Steve G. Mann It is certified that error appears in the above-identified patent and that said Letters Patent is hereby corrected as shown below:

Title page,
Item [56], References Cited, insert the following:

-- OTHER PUBLICATIONS
Mann, S., "'Pencigraphy' with AGC: Joint Parameter Estimation in Both Domain and Range of Functions in same Orbit of the Projective-Wyckoff Group"; MIT Media Laboratory; IEEE International Conference on Image Processing (ICIP-96), September 16-19, 1996, Lausanne, Switzerland.
Mann, S., "Mediated Reality", December 1994, MIT-D151-383; MIT-ML Percom TR-260, 1994.
Mann S., "Wearable Computing: A First Step Toward Personal Imaging", Computer, vol. 30, no. 2, February 1, 1997, pages 25-32. --

Column 28,
Line 4, change "heads ear" to -- headgear --.
Line 9, replace "head gear" to -- headgear --.

Signed and Sealed this

Twenty-second Day of July, 2003

JAMES E. ROGAN
*Director of the United States Patent and Trademark Office*